US007043477B2

(12) United States Patent
Mercer et al.

(10) Patent No.: US 7,043,477 B2
(45) Date of Patent: May 9, 2006

(54) NAVIGATING MEDIA CONTENT VIA GROUPS WITHIN A PLAYLIST

(75) Inventors: Ian Cameron Mercer, Sammamish, WA (US); Kevin Leigh LaChapelle, Redmond, WA (US); Harutoshi Miyamoto, Ibaraki (JP); Yoshifumi Yanagawa, Kyoto (JP); Nobuyasu Takeguchi, Kawachinagano (JP); Chiyoko Matsumi, Suita (JP)

(73) Assignees: Microsoft Corporation, Redmond, WA (US); Matsushita Electric Industrial Co., Ltd., Osaka (JP)

( * ) Notice: Subject to any disclaimer, the term of this patent is extended or adjusted under 35 U.S.C. 154(b) by 252 days.

(21) Appl. No.: 10/273,415

(22) Filed: Oct. 17, 2002

(65) Prior Publication Data

US 2004/0078383 A1   Apr. 22, 2004

Related U.S. Application Data

(60) Provisional application No. 60/418,973, filed on Oct. 16, 2002.

(51) Int. Cl.
G06F 17/30   (2006.01)
(52) U.S. Cl. .......................... 707/7; 707/100; 707/101; 707/102; 707/103 R; 707/104.1
(58) Field of Classification Search ................ 709/223; 386/46; 725/36; 345/716; 715/810; 707/102, 707/3, 104.1, 7, 100, 101, 103 R; 700/94
See application file for complete search history.

(56) References Cited

U.S. PATENT DOCUMENTS 5,428,732 A   6/1995   Hancock et al.
5,616,876 A   4/1997   Cluts
5,742,347 A   4/1998   Kandlur et al.
5,870,553 A   2/1999   Shaw et al.
5,892,535 A * 4/1999   Allen et al. ................... 725/36
5,996,015 A   11/1999  Day et al.

(Continued)

FOREIGN PATENT DOCUMENTS

EP   1288942 A1   3/2003

(Continued)

OTHER PUBLICATIONS

Hu et al., "Multimedia Description Framework (MDF) for content description of Audio/Video Documents," Proceedigns of the fourth ACM conference on Digital libraries, 1999, pp. 67-75, ACM Press, New York, U.S.A.

(Continued)

*Primary Examiner*—Frantz Coby
(74) *Attorney, Agent, or Firm*—Senniger Powers

(57) ABSTRACT

Grouping and navigating media files within a playlist on a computer-readable medium. Invention software selects media files according to a grouping criterion to define a group from the media files. The invention software generates a group header associated with the group. The group header includes a value identifying the defined group and a reference to another group to enable navigation. The invention software stores the selected media files, the playlist, the defined groups, and the associated group headers on a computer-readable medium. The invention software also includes playback software for navigating and selecting media files via groups within a playlist. In one embodiment, the invention is operable as part of a compressed media format having a set of small files containing metadata, menus, and playlists in a compiled binary formal designed for playback on feature-rich personal computer media players as well as low cost media players.

41 Claims, 12 Drawing Sheets

U.S. PATENT DOCUMENTS

| | | |
|---|---|---|
| 6,006,234 A | 12/1999 | Govindarajan et al. |
| 6,199,059 B1* | 3/2001 | Dahan et al. ............... 707/3 |
| 6,201,540 B1 | 3/2001 | Gallup et al. |
| 6,212,524 B1* | 4/2001 | Weissman et al. .......... 707/101 |
| 6,240,407 B1* | 5/2001 | Chang et al. ............... 707/2 |
| 6,256,031 B1* | 7/2001 | Meijer et al. ............... 715/854 |
| 6,263,341 B1* | 7/2001 | Smiley .................. 707/103 R |
| 6,269,394 B1* | 7/2001 | Kenner et al. ............. 709/217 |
| 6,282,548 B1* | 8/2001 | Burner et al. ............ 707/104.1 |
| 6,311,194 B1* | 10/2001 | Sheth et al. ................ 715/505 |
| 6,356,921 B1 | 3/2002 | Kumar et al. |
| 6,363,377 B1* | 3/2002 | Kravets et al. ............... 707/4 |
| 6,389,426 B1* | 5/2002 | Turnbull et al. ........... 707/102 |
| 6,405,215 B1* | 6/2002 | Yaung .................... 707/104.1 |
| 6,430,575 B1* | 8/2002 | Dourish et al. ............ 707/200 |
| 6,449,341 B1* | 9/2002 | Adams et al. ................ 379/9 |
| 6,484,156 B1 | 11/2002 | Gupta et al. |
| 6,526,411 B1* | 2/2003 | Ward ......................... 707/102 |
| 6,557,042 B1 | 4/2003 | He et al. |
| 6,657,117 B1* | 12/2003 | Weare et al. ................ 84/668 |
| 6,661,437 B1* | 12/2003 | Miller et al. ............... 715/810 |
| 6,721,489 B1* | 4/2004 | Benyamin et al. ........... 386/46 |
| 6,728,729 B1* | 4/2004 | Jawa et al. .............. 707/104.1 |
| 6,735,628 B1* | 5/2004 | Eyal ......................... 709/223 |
| 6,760,721 B1* | 7/2004 | Chasen et al. ................ 707/3 |
| 6,839,059 B1 | 1/2005 | Anderson et al. |
| 6,865,431 B1* | 3/2005 | Hirota et al. ................. 700/94 |
| 2001/0001160 A1 | 5/2001 | Shoff et al. |
| 2001/0011284 A1 | 8/2001 | Humpleman et al. |
| 2002/0026521 A1 | 2/2002 | Sharfman et al. |
| 2002/0033844 A1 | 3/2002 | Levy et al. |
| 2002/0078144 A1 | 6/2002 | Lamkin et al. |
| 2002/0082730 A1 | 6/2002 | Capps et al. |
| 2002/0122137 A1 | 9/2002 | Chen et al. |
| 2002/0151363 A1 | 10/2002 | Letovsky et al. |
| 2002/0161911 A1 | 10/2002 | Pinckney, III et al. |
| 2002/0172495 A1 | 11/2002 | Han |
| 2002/0180803 A1 | 12/2002 | Kaplan et al. |
| 2003/0009452 A1 | 1/2003 | O'Rourke et al. |
| 2003/0016950 A1 | 1/2003 | Ando et al. |
| 2003/0023975 A1 | 1/2003 | Schrader et al. |
| 2003/0028505 A1 | 2/2003 | O'Rourke et al. |
| 2003/0108335 A1 | 6/2003 | Nakamura et al. |
| 2003/0151618 A1* | 8/2003 | Johnson et al. ............. 345/716 |
| 2004/0001106 A1 | 1/2004 | Deutscher et al. |
| 2004/0003398 A1 | 1/2004 | Donian et al. |
| 2004/0064476 A1 | 4/2004 | Rounds |

FOREIGN PATENT DOCUMENTS

| | | |
|---|---|---|
| WO | WO 01/28222 A2 | 4/2001 |
| WO | WO 03/023781 A1 | 3/2003 |

OTHER PUBLICATIONS

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne et al., "mpME!: Music Recommendation and Exploration," Proceedings of the 7th international conference on Intelligent user interfaces, 2002, p. 235, ACM Press, New York, U.S.A.

* cited by examiner

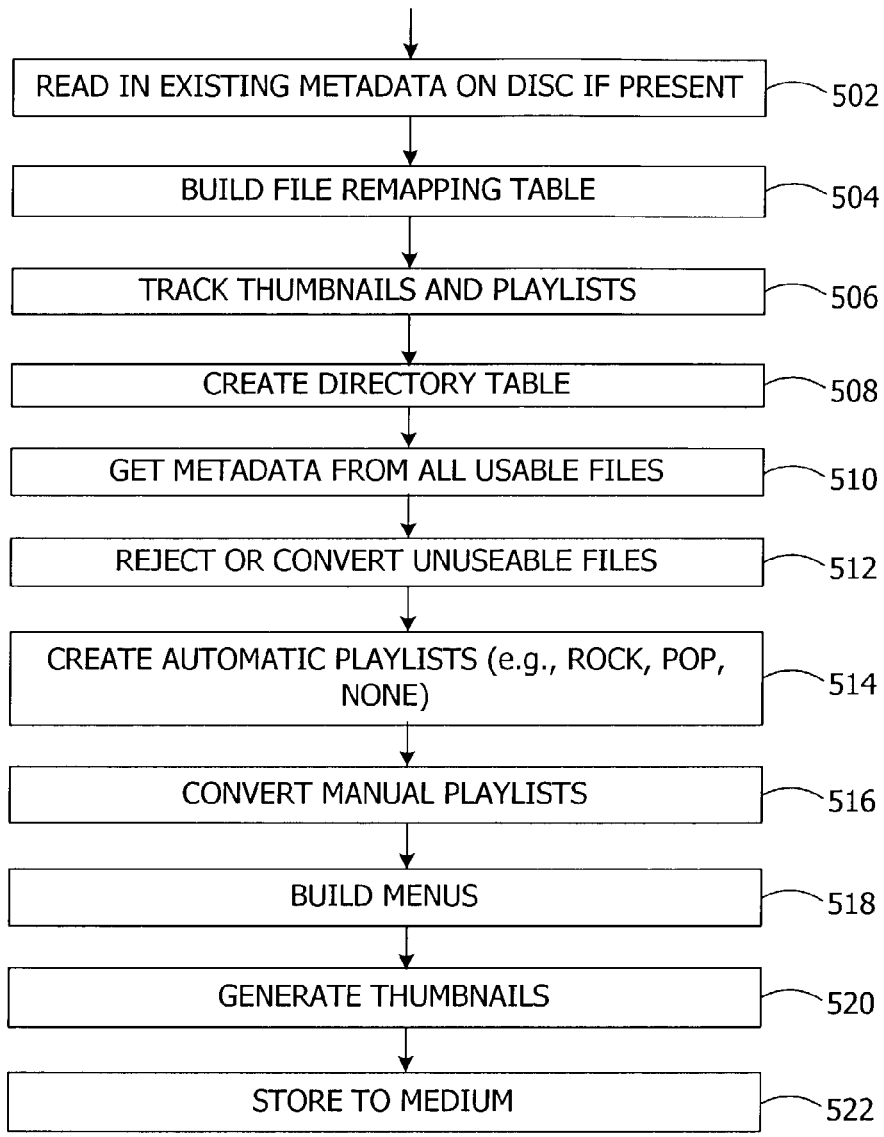
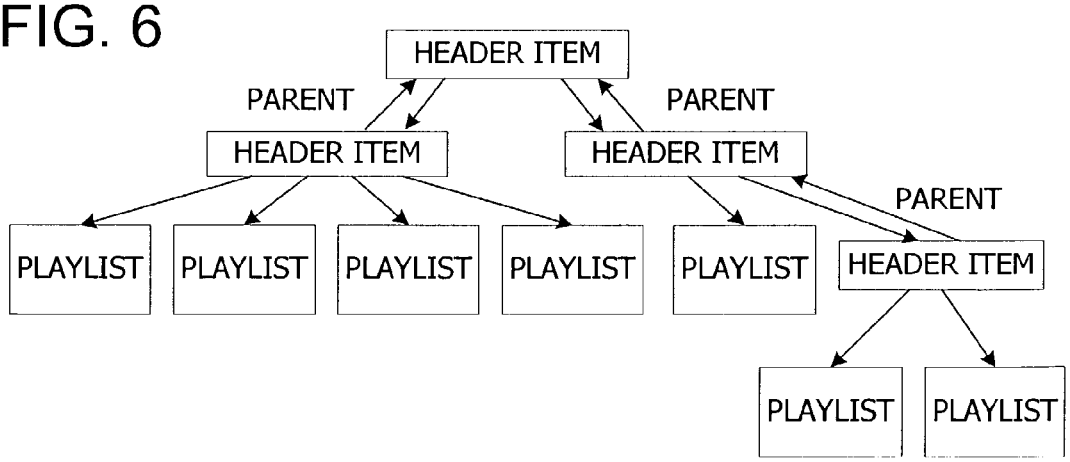

NAVIGATING MEDIA CONTENT VIA GROUPS WITHIN A PLAYLIST

CROSS-REFERENCE TO RELATED APPLICATION

This application is based upon a U.S. Provisional Patent Application entitled "COMPRESSED MEDIA FORMAT SPECIFICATION," filed Oct. 16, 2002, naming Mercer et al. as inventors. The entirety of such provisional patent application is incorporated by reference herein.

TECHNICAL FIELD

The present invention relates to the field of digital media content. In particular, this invention relates to navigating media content via groups within a playlist.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) files. The computer typically organizes the media files into playlists when the compressed media files are played on the computer. For example, in the case of audio media files, the files may be organized by album, artist, genre, date, or some user specified selection and ordering. A user easily navigates through this organization using menus and graphical displays to render the desired media files. However, the same organization and navigation are not possible with presently available systems when the media files are copied to a writeable CD or writeable DVD and rendered in a portable CD player, car receiver, DVD player, or any other consumer electronic device. Such devices typically suffer from a low power processor, limited memory availability, limited display, and/or limited user input capabilities. That is, navigation of media files organized in a directory structure on a removable medium by a presently available consumer electronic device at most includes only a flat forward/backward navigation metaphor through each of the directories. Presently available systems lack a data structure to represent multiple parallel groupings of the media files.

For these reasons, a system for navigating media content via groups within playlists is desired to address one or more of these and other disadvantages.

SUMMARY OF THE INVENTION

The invention includes software for grouping and navigating media files on a computer-readable medium. In particular, the invention includes authoring software for use on a computing device such as a personal computer and playback software for use on a computing device such as a consumer electronic device. In one embodiment, the invention is operable as part of a compressed media format having a set of small files containing metadata, menus, and groups within playlists in a compiled binary format designed for playback on feature-rich personal computer media players as well as low cost media players. The format encompasses audio, still images, and video in various formats. The playlist is a convenient way to organize groups of audio, video, and image files. A user creates playlists for different performers or different kinds of music or videos. The user can manipulate the created playlists by shuffling or repeating the playlists.

With the invention, playlists such as "all songs by genre" are created automatically and written to a removable computer-readable medium whenever the user copies music files to the removable computer-readable medium. Unlike playlists on the personal computer, which are simple flat lists of media files, the playlists of the invention include one or more groups that allow the user to use a simple navigation metaphor such as 'Next' and 'Previous' to navigate within the groups to the desired album, artist, genre, etc. Groups are stored in an efficient format within playlists and are named so that the user can see which group is currently playing and can navigate quickly to another group even in an environment offering little option for advanced user input, such as in an automobile. The invention supports audio, video, and images, supports transitions between images, improves user navigation, supports repeat count (e.g., kiosk), and supports parallel playback of files such as images with audio. In addition, groups can be automatically created by date so that, for example, the user can skip from one event to the next within a set of digital photographs using the same easy navigation metaphor.

In accordance with one aspect of the invention, a method groups media files within a playlist. The method includes selecting one or more media files according to a grouping criterion to define a group from the media files. The defined group references each of the selected media files. The method also generates a group header associated with the group. The group header includes a value identifying the defined group and a reference to another group to enable navigation. The method also stores the media files, the defined group, and the associated group header on a computer-readable medium.

In accordance with another aspect of the invention, one or more computer-readable media in a media authoring tool have computer-executable components for grouping a plurality of media files. The components include a playlist module for selecting one or more media files according to a grouping criterion to define a group from the media files. The defined group references each of the selected media files. The method also includes a population module for generating a group header associated with the group. The group header includes a value identifying the defined group and a reference to another group to enable navigation. The method includes a writer module for storing the selected media files, the defined group, and the associated group header on a computer-readable medium.

In accordance with yet another aspect of the invention, a computer-readable medium stores a data structure representing a group within a playlist. The data structure includes a playlist group including a group header and group data. The group header includes a group number field storing a value identifying the playlist group. The group header also includes an offset field storing a reference to another playlist group. The group data references a group of media files. The data structure also includes a playlist header including a playlist summary type field storing a value identifying a type for the group of media files.

In accordance with still another aspect of the invention, a media player enables navigation among groups of media files. The media player includes an input module for reading a playlist group referencing one or more media files. The playlist group includes a group header and group data from a computer-readable medium. The group header includes a value identifying the playlist group and a reference to another playlist group. The value corresponds to a group description associated with the playlist group. The playlist group also includes an interface module for displaying the group description to a user. The playlist group also includes a selection module for navigating, responsive to input from the user, to the other playlist group via the reference.

Alternatively, the invention may comprise various other methods and apparatuses.

Other features will be in part apparent and in part pointed out hereinafter.

BRIEF DESCRIPTION OF THE DRAWINGS

FIG. 5 is another flow chart illustrating exemplary operation of authoring software according to the invention.

FIG. 6 is a block diagram illustrating an exemplary menu structure.

Corresponding reference characters indicate corresponding parts throughout the drawings.

DETAILED DESCRIPTION OF THE INVENTION

The invention includes, but is not limited to, authoring software and playback software. The authoring software selects one or more media files according to a grouping criterion to define a group from the media files. The defined group references each of the selected media files. The authoring software generates a group header associated with the group. The group header includes a value identifying the defined group and a reference to another group to enable navigation. The authoring software stores the selected media files, the defined group, and the associated group header on a computer-readable medium. The playback software allows a user to navigate and select media files via groups within a playlist. In one embodiment, the invention software is operable as part of a compressed media format (see FIG. 10) having a set of small files containing metadata, menus, and playlists in a compiled binary format designed for playback on feature-rich personal computer media players as well as low cost media players. For example, a typical low-end portable CD player might have as little as one hundred kilobytes of working memory, an eight-bit central processing unit running at only one megahertz and a very slow CD-drive mechanism with a maximum seek time of nearly five seconds.

Media Environment

Figure 1:
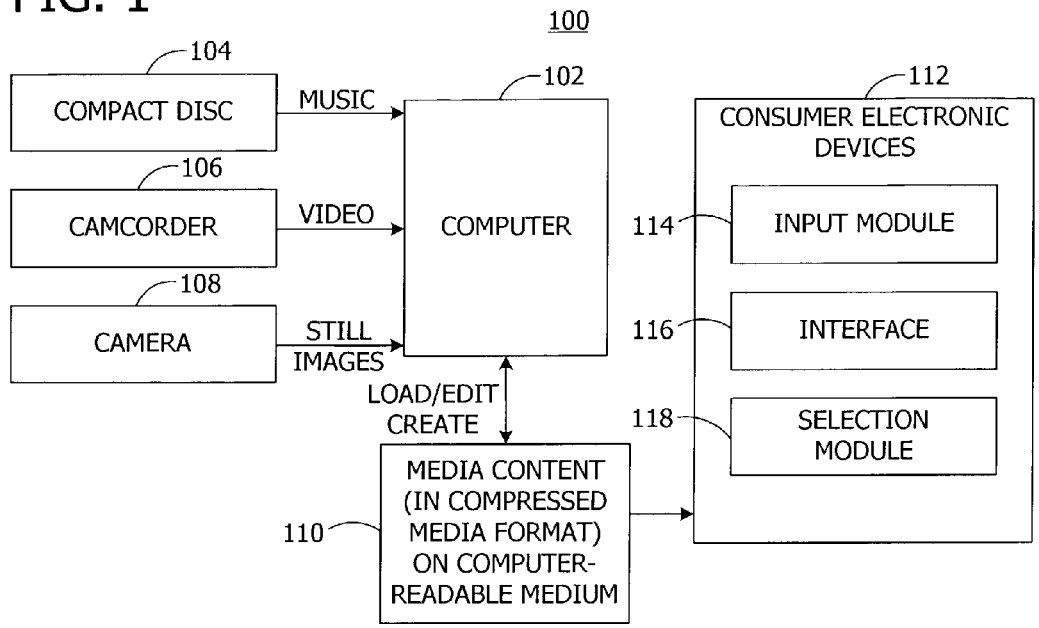
FIG. 1 is a block diagram illustrating one example of a suitable media environment in which the invention may be implemented.

Referring now to the drawings, FIG. 1 illustrates an exemplary multimedia environment in which the invention can be used. A system 100 has one or more computers 102 coupled to one or more devices providing media content. For example, the devices may include a CD 104, a camcorder 106, or a camera 108. The computer 102 accesses the media content as input and can render or store the media content as a digital media file to a computer-readable medium 110 as described with reference to FIG. 4 and FIG. 5 below.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

In the invention, the media players, consumer electronic devices 112, or the like may be organized into three exemplary levels according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Level 1 media players include audio-only players such as portable CD players, car receivers, and DVD players. In addition to Level 1 media players, level 2 media players include audio and still image capable players including portable and set-top DVD players optionally capable of rendering images with audio simultaneously. Level 3 media players include level 2 media players and audio, still image, and video capable players. Exemplary consumer electronic devices 112 include, but are not limited to, the following: a portable CD player, an MP3 player, an audio system in an automobile, a personal digital assistant, a cellular telephone, or the like.

A media player according to the invention includes software allowing navigation among groups of media files. An exemplary consumer electronic device 112 or media player includes an input module 114, an interface module 116, and a selection module 118. The input module 114 reads a playlist group referencing one or more media files. For example, the media files may be stored on a computer-readable medium. The playlist group includes a group header and group data from a computer-readable medium. The group header includes a value identifying the playlist group and references to other playlist groups. The value corresponds to a group description associated with the playlist group. For example, the group header may include a memory location offset to a next playlist group, a memory location offset to a previous playlist group, or a pointer to a memory location associated with another playlist group. The interface module 116 displays the group description to a user. The selection module 118 navigates, responsive to input from the user, to another playlist group via the reference in the group header.

Playlists

A playlist is a convenient way to organize groups of audio, video, and image files on a computer-readable medium. The playlist may include, but is not limited to, one or more of the following: a media file, a group of audio files, a group of video files, a group of timed image sequences, and a group of complex parallel combinations of images with audio. For example, a user may create playlists for different performers or different kinds of music or videos. The user also can manipulate the created playlists by shuffling or repeating the playlists. Such shuffle or random play options may operate at the group level or at the individual media file level, which allows, for example, playback of all songs by a random artist before proceeding to the next random artist. Playlists allow the user to easily view a listing of media files to sort, search, and quickly navigate.

Figure 2A:
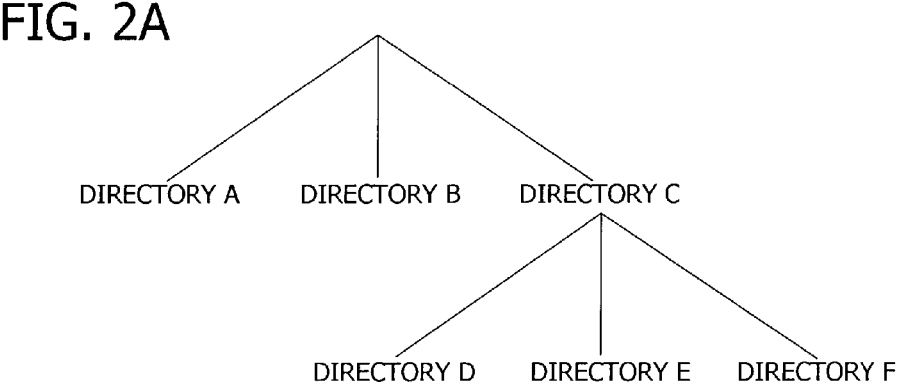
FIG. 2A is an exemplary block diagram of a hierarchical directory structure.
Figure 2B:
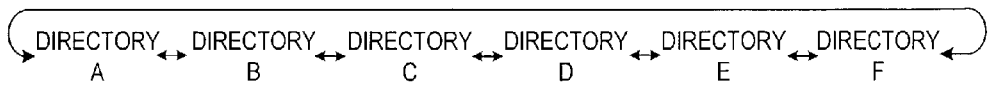
FIG. 2B is an exemplary block diagram illustrating navigation of the flattened directory structure from FIG. 2A by presently available systems.

Each playlist includes a flat list of media files and the playlists may be organized in a hierarchical data structure such as illustrated in FIG. 2A. In FIG. 2A, a root directory includes playlist A, playlist B, and playlist C. Playlist C further includes some media files along with playlist D, playlist E, and playlist F in this example. On a computer such as a personal computer with sufficient memory and processor speed, the user can navigate the hierarchical structure via a sophisticated or rich media player to easily select the desired playlist and render the content in the selected playlist via a media player. However, the computing logic, resources, playlists, and media files associated with presently available media players and consumer electronic devices such as a CD player or MP3 player lack the capability to allow a user to perform such direct navigation and selection. At best, computing logic in an existing consumer electronic device flattens the hierarchical structure and allows simple forward/backward navigation through the entire flattened structure as illustrated in FIG. 2B. In FIG. 2B, the user is able to only step forward or backward through the entire ordered, flattened structure: playlist A, playlist B, playlist C, playlist D, playlist E, and playlist F. The user is unable to navigate among a select group of playlists in the ordered, flattened structure of some existing systems or navigate the media files in any other manner.

Groups within Playlists

The invention software creates playlists automatically and writes them to a removable computer-readable medium in a specific binary format (see below) whenever the user copies media files to the removable computer-readable medium 110 for rendering on the consumer electronic device 112. Software to create compliant computer-readable media might, for example, create a playlist 'All songs grouped by artist' and another 'All images grouped by month taken.' Unlike presently available playlists, which are simple flat lists of media files, the playlists of the invention include one or more groups (e.g., album, artist, genre, or date) that allow the user to use a simple navigation metaphor such as 'Next' and 'Previous' to navigate to the desired group within the playlist. This type of navigation according to the invention is possible on a computer as well as on a consumer electronic device with limited resources such as a small display, a television screen, or a remote infrared (IR) keypad.

Figure 3:
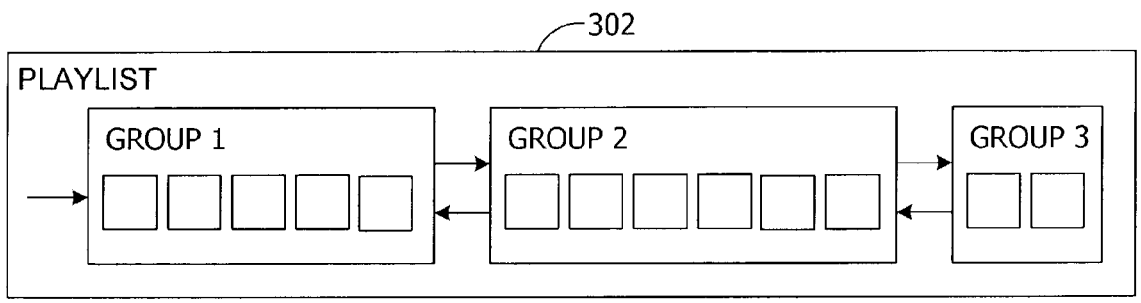
FIG. 3 is an exemplary block diagram illustrating groups within a playlist.

As illustrated in FIG. 3, groups within a playlist 302 allow a simple 'next group'/'previous group' capability to skip album-by-album, artist-by-artist, genre-by-genre, film-roll-by-film-roll, directory-by-directory or any other logical grouping of media files to select and render the desired set of media files. In FIG. 3, the user can navigate sequentially forward and backward among Group 1, Group 2, and Group 3 in the playlist 302.

In a car audio example, the user can navigate the media content via groups within playlists (e.g., the user simply presses 'Next Group' and sees the name of the group now playing) with minimal effort and distraction. In one embodiment, a 'Next Group' and a 'Previous Group' button provide this capability (possibly overloading the 'Next Chapter' and 'Previous Chapter' buttons on a DVD remote control or the 'Next Track' and 'Previous Track' buttons on a CD player). Some advanced media players (e.g., one with a remote IR keypad and a connected TV display) might even provide a drop-down, or other style of menu for group selection within a playlist allowing users to get quickly to a specific group without having to step through them sequentially.

The computer-readable medium 110 stores groups in an efficient format within playlists (e.g., playlist 302). The groups are named so that the user can see which group is currently playing. Each group has a name that will typically be displayed while that group is playing (although in the case of video or image files it might not be displayed or it might be displayed for only a few seconds after skipping).

Each media type (audio, images, video) stored in a playlist may be grouped. In one embodiment, grouping information is stored in a header with one or more actual group lists (audio, images, video, and parallel type). The offsets to next and previous group fields allow media players to navigate quickly to the next or previous group in the playlist. In another embodiment, pointers or other links to the next and previous groups replace the offsets. A group number is a reference in a separate name table so that the media player can display the name of the group currently playing. Group numbers may be reused in order to conserve name space (e.g. if Group 345 was 'June 2002' then '345' could be used in an image playlist and in a video playlist to represent all the images or video captured during June 2002). The group number in the playlist file is unique for all groups. The Text name may be reused because there uniqueness is not required. The actual files may be represented in any number of groups in any number of different ways.

Authoring Software

Figure 4:
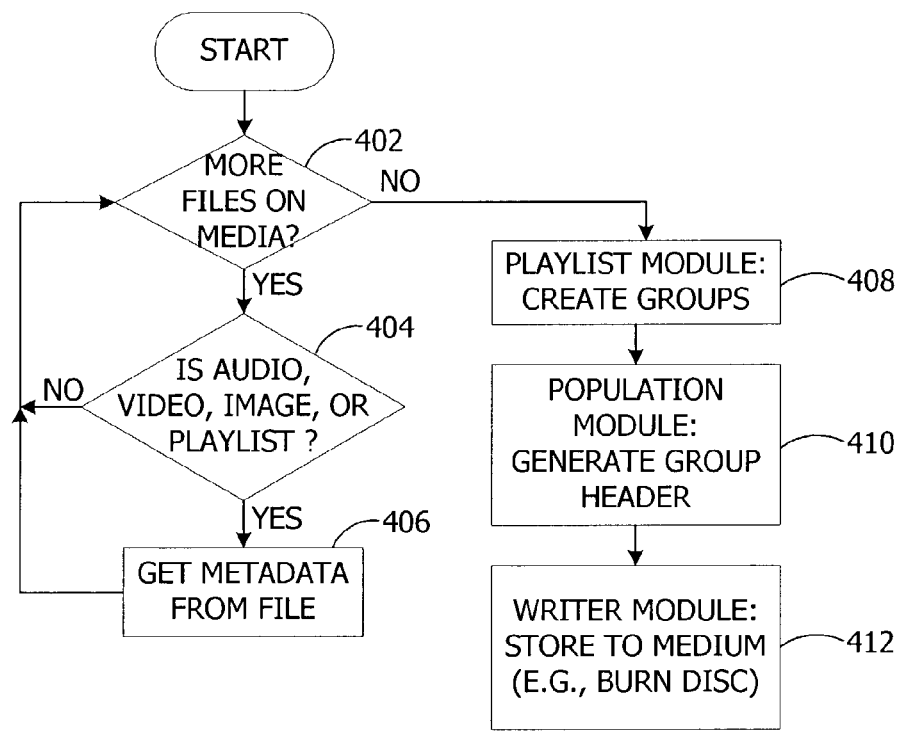
FIG. 4 is a flow chart illustrating exemplary operation of authoring software according to the invention.

As illustrated in FIG. 4, exemplary authoring software, a creation application program, or the like groups one or more input media files. Proceeding from 402, for each input media file, the authoring software determines at 404 if the input media file includes audio data, video data, image data, or a playlist. If the input media file includes such data, then metadata is obtained from the input media file for use in defining groups at 406. If there are no more files on the input medium, as determined at 402, the authoring software selects one or more media files from the input media files according to a grouping criterion to define a group at 408. The defined group references the selected media files. The references include, but are not limited to, a memory location offset to the selected media files a pointer to a playlist referencing the selected media files, or a pointer to the selected media files. At 410, the authoring software generates a group header associated with the group. The group header includes a value identifying the defined group and references to the preceding and following group to enable navigation between the groups. At 412, the authoring software also stores the selected media files, the defined group, and the associated group header on a computer-readable medium. For example, the authoring software may include, or interface with, software to burn a CD.

In a media authoring tool according to the invention, one or more computer-readable media have computer-executable components for grouping media files as described herein and illustrated in FIG. 4. The media files include, but are not limited to, one or more of the following: an audio file, a video file, and a still image file. The components include a playlist module for selecting the media files according to a grouping criterion to define a group from the input media files. In one embodiment, the playlist module is responsive to input from a user. For example, the user may specify the grouping criterion to select the media files according to artist, genre, album, date, directory name, or other criteria including user-defined groupings of the media files. The components also include a population module for generating a group header associated with the group. The group header references another group. For example, the group header may include a memory location offset, pointer, or other reference to a next group and/or a previous group. The components also include a writer module for storing the selected media files, the defined group, and the associated group header on a computer-readable medium. In one embodiment, the components also include an input module for parsing the input media files to determine a playlist summary type associated with each of the media files. The playlist summary type identifies each of the parsed media files as comprising audio data, video data, or image data. The input module also reads an input playlist to define a group from the read playlist.

In one embodiment, the authoring software for creating groups within playlists and storing the groups on a computer-readable medium executes automatically whenever the selection of files to be written to a computer-readable medium includes primarily audio, video or still images. In addition, the authoring software executes whenever the application program detects an existing set of groups within playlists already on the medium. The authoring software also executes whenever the user attempts to write media files to the medium. The selected media files may be organized according to an existing structure.

As illustrated in FIG. 5, the authoring software analyzes all the media files that the user has selected to write to the medium to construct playlists to give the user a rich experience when the media files are rendered by a compliant media player. The authoring software parses a metadata header for every selected media file and playlist and stores the parsed information in memory. After reading in existing metadata on disk (if present) at 502, the authoring software builds a number remapping table at 504, tracks thumbnails and playlists at 506, creates a directory table at 508, and otherwise obtains metadata from all analyzed media files at 510. Proceeding to 512, any files that do not meet certain criteria (see below) during this process will be converted, rejected, and/or filtered out from the list and removed from the memory copy of any playlists in which they occur. Playlists are checked to ensure all the files they contain are present within the list of files to be written to the medium. Files not present are purged from the playlists. Any playlists that are empty as a result of these purge operations are then removed. A list of all the files removed in this way will be created and a warning issued to the user.

In one embodiment, the authoring software rejects various files that do not meet one or more of the following criteria: audio is less than 64 kbps, audio is more than 160 kbps, audio uses an unknown compressor-decompressor, MP3 file is outside allowed specification, image is not a Joint Photographic Experts Groups (JPEG) file, video frame size is larger than 720×576, interlaced video is not 480 or 576 lines, video frame rate is greater than 30 frames per second, horizontal frame size is not an allowed value, pixel aspect ratio is outside allowed range, and video bit rate is more than 1.9 Mbps. The authoring software may list the rejected files, or may group the rejected files as 'Audio', 'Images', 'Video', 'Playlists' with a number representing the number of rejected files for the group (e.g., 'Audio files (5)'). The user examines the list by expanding and collapsing sections. As the user selects each file name, the user interface explains why the file has been disallowed.

Referring further to FIG. 5, the authoring software proceeds to 514 and 516 for creating playlists, groups within the playlists, and menus based on the parsed, stored information. In particular, the authoring software creates a default set of automatic playlists, and converts any input (or manual) playlists including any M3U, ASX or WPL playlist files. Menus are built at 518, thumbnails are generated at 520, and all the necessary information is stored to the computer-readable medium at 522. The following sections describe an exemplary implementation of the playlist and menu creation operations.

Playlist and Menu Creation

This section describes an exemplary method performed by the authoring software to create playlists from the selected media files and organize the playlists in a hierarchical structure. Operation of the method is based on the type and existing organization of the selected media files. If the selected media files are in a single layer of directories, the authoring software creates a playlist such as 'All media files by directory' in which the media files are grouped by directory name in alphabetical order by file names. If two layers of directories are present and the average top level directory contains less than one and a half subdirectories and more than seventy-five percent of the second level directories contains between five and twenty-five audio files (e.g., a typical artist-album structure with only a few albums for each artist), the authoring software creates a playlist 'All media files by directory' in which the media files are grouped by <directory name 1+'–' directory name 2> in <directory name 1> then <directory name 2> in alphabetical order.

If more than two layers of directories are present or the two layers are too 'leafy' (e.g., contain too many subdirectories per directory) to readily flatten the hierarchy, then the authoring software creates a playlist 'All media files by directory' in which the media files are grouped by <lowest directory name> in the order the directories are found in the file system as the file system is traversed breadth first (not in alphabetical order). If there are any non-null playlist files present, the authoring software creates a playlist for each playlist present. Such playlists are stored under a 'Playlists' menu if there are more than five such playlists. If there are between two and six playlists present, the authoring software creates all remaining menus under a menu item entitled 'Other'

Playlists for Audio Media Files

The authoring software creates a hierarchical menu structure for organizing the created playlists. In an exemplary embodiment with audio media files, the authoring software creates groups and corresponding menus according to artist, composer, album, artist and album, genre, year, and directory (e.g., corresponding to the existing structure of the selected media files).

At the root of the hierarchical menu structure, a menu entitled 'Artists' has a submenu entitled 'All songs by artist' in which the media files are grouped by artist in alphabetical order. The authoring software creates a submenu for each artist in which the media files associated with the artist are grouped by album in alphabetical order or according to a release date for the album. If composer information is available for some of the selected media files (e.g., greater than twenty-five percent), the authoring software creates a menu 'Composer' at the root with a submenu entitled 'All songs by composer' in which the media files are grouped by composer in alphabetical order. The authoring software creates a submenu for each composer in which the media files associated with the composer are grouped by album in alphabetical order or according to a release date for the album. Media files without composer information are omitted.

The authoring software also creates a menu 'Albums' at the root with a submenu entitled 'All songs by album' in which the media files are grouped by album in alphabetical order or according to a release date for the album. The authoring software further creates a menu 'Artist-Album' at the root in which the media files are grouped according to artist-album pair (i.e., a single group is created for each artist-album pairing). The authoring software also creates a menu 'Genres' with a submenu 'All songs by genre' in which the media files are grouped by genre in alphabetical order (i.e., a single group is created for each genre). A menu 'Year' includes, but is not limited to, the submenus 'All songs by decade,' 'All songs by year,' and 'Directories.' The submenu 'All songs by decade' includes media files grouped by decade in ascending order (e.g., one group for each decade) with 'No year' songs grouped at the end of the groups or omitted. The submenu 'All songs by year' includes media files grouped by year in ascending order (e.g., one group for each year) with 'No year' songs grouped at the end of the groups or omitted. The submenu 'Directories' has groups that parallel an existing directory structure of the selected media files. That is, the submenu 'Directories' has one group for each directory (e.g. "Party Favorites", "Driving music").

Those skilled in the art will appreciate that the playlists and hierarchical structures described herein are merely exemplary. It is contemplated by the inventors that the invention includes other playlists, hierarchical structures, and the like, including any combination of audio data, video data, or still image data.

Playlists for Image Media Files

If the selected media files include still image, the authoring software creates a menu 'All pictures' at the root including every selected image for display (e.g., with a default duration of five seconds). In one embodiment, the duration can be changed via an advanced options dialog in a user interface associated with the authoring software. In addition, the authoring software examines the co-incidence of the selected images and selected music files in existing directories. If all of the directories that have images (e.g., larger than 200×200 pixels) also have music, the authoring software creates a playlist entitled "All pictures with all songs (endless)" arranged by directory so that each directory plays with the accompanying music. In one embodiment, the display time for each image equals the sum of the song lengths in the directory divided by the number of images. For example, each image may be displayed for a minimum of five seconds and a maximum of thirty seconds. The maximum and minimum settings are user adjustable in an advanced options dialog. Some images may not be displayed using this technique if the music in a directory is too short for all the images that are in the directory.

Alternatively, the playlists "All pictures with all songs (endless)" includes all songs playing in parallel with all the images. In one embodiment, the display time for each image equals the sum of the lengths of all the songs in the selected media files divided by the number of images. For example, each image is displayed for a minimum of five seconds and a maximum of thirty seconds. The maximum and minimum settings are user adjustable in an advanced options dialog. The image sequence is repeated as necessary to match the length of music or the music is repeated in the playlist to ensure there is enough music to match the total image length. Images are grouped, for example, by lowest directory name.

Playlists for Video Media Files

If the selected media files include video, the authoring software creates a menu 'Video' at the root of the hierarchical structure. The menu includes a playlist for each video file as well as a playlist for all video files entitled 'Play all videos' with video files concatenated in alphanumeric sequence. The authoring software also groups the video media files according to user input, as described in the following section.

Manual Adjustments to Automatic Playlists

The user may choose to adjust the hierarchical structure and/or default playlists. The user interface associated with the authoring software displays a diagram of the hierarchical structure and playlists with all options pre-checked for inclusion on the computer-readable medium. For example, the menu/playlist structure is displayed as a scrolling treeview with checkboxes next to each menu or playlist item. Clearing a check box eliminates that entire branch of the tree (although the state of the items below it is preserved in case the user reinstates it).

The user interface associated with the authoring software may implement various or disable various features. For example, promote and demote buttons may not be selectable (e.g., grayed-out) if the currently selected item cannot be promoted or demoted. No choice is given to the user where to demote an item, it automatically goes under the correct heading, adding that heading if necessary. For example, if there are three video files in the top-level menu and no 'Video' menu entry, the first demotion will create a heading 'Other video', the second demotion will add to that, the third demotion will rename the heading to 'Video.' No option is given to change the order of the menus or playlists or to change their names. All names are derived from metadata in files or are automatically generated names like 'Other video.' When an individual playlist is promoted to the same level as its containing category the containing category changes name to 'Other . . . ' (e.g. 'Other video').

Other options for the user interface associated with the authoring software include, but are not limited to, adjusting a 'Minimum image duration,' a 'Default image duration,' a 'Maximum image duration,' and a 'Repeat forever (kiosk mode).' The 'Minimum image duration' option allows the user to change the minimum duration for images (the default is, for example, five seconds). The minimum duration is used with the maximum when creating parallel image and audio playlists. The 'Default image duration' option allows the user to change the default duration for images. The default duration is used for images playing as part of an image sequence. The 'Maximum image duration' option allows the user to change the maximum duration for images. This option is used when images and audio are presented together. The 'Repeat forever (kiosk mode)' option causes the repeat count field for each playlist to be set to zero. If this option is not checked, the repeat count is set to '1' for each playlist. In one embodiment, the user may be given options to merge playlists or perform more advanced editing of the menu names and menu structures created automatically. Users can also create playlist files prior to executing the authoring software. Those skilled in the art will note that the authoring software may include more or less functionality than described herein and still be within the scope of the invention.

After any manual adjustments have been made to the hierarchical structure and/or the default playlists, a menu structure exists such as illustrated in the exemplary menu structure of FIG. 6. In one embodiment, the authoring software includes a menu simplifier that traverses the created menu structure searching for menus that have only one child. The menu simplifier removes any such menus and promotes the only child in the hierarchy to take the place of the removed menu. In this fashion, the menu simplifier reduces the complexity of the menu structure to simplify navigation by the user.

The authoring software writes a setup file (e.g., in extensible markup language) to the computer-readable medium recording both the default settings and any manual settings of the user. If the user later adds more media files to the same medium (e.g., a re-writeable medium), the authoring software examines the setup file to identify and apply those same settings. For example, if the user deletes all of the default playlists and selects only an 'All songs by lowest directory name' option, then such option will be the default for that computer-readable medium each time the user attempts to add media files to the medium. The authoring software identifies such customized options for the specific medium to the user.

Figure 7:
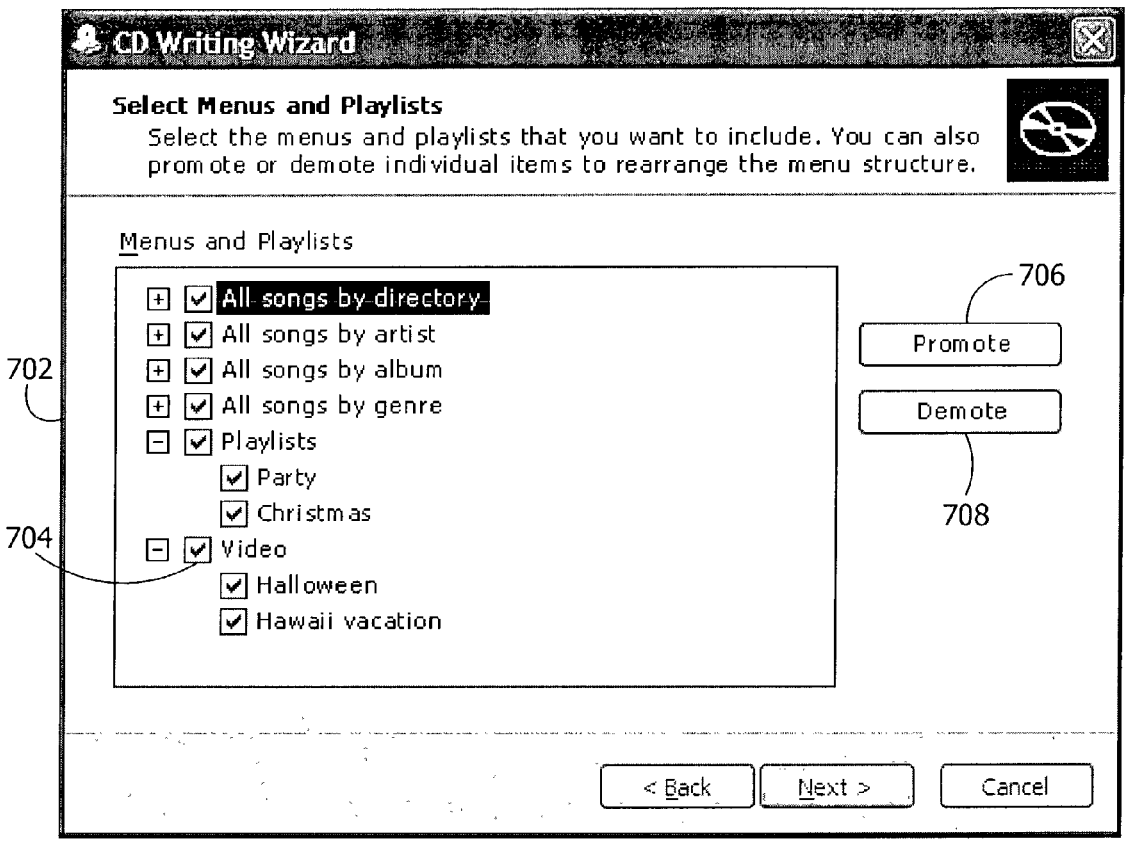
FIG. 7 is a screen shot of an exemplary user interface for the authoring software of the invention.

FIG. 7 is a screen shot of an exemplary user interface for the authoring software of the invention.

Data Structure for Playlists and Groups within Playlists

Those skilled in the art will note that there are many data structures suitable for the hierarchical structure, playlists, and groups within the playlists according to the invention. The following description is merely one example of the data structures, fields, and values that could be used to implement the invention software.

A computer-readable medium stores a data structure representing a group within a playlist. The data structure includes, but is not limited to, a playlist group and a playlist header. The playlist group includes a group header and group data. The group header includes a group number field storing a value identifying the playlist group. The group number field stores a value corresponding to a group description for the playlist group. The group header further includes an offset field storing a reference to another playlist group. In one embodiment, the offset field stores a memory location offset to a next playlist group, a memory location offset to a previous playlist group, and/or a pointer to a memory location associated with another group. The group header further includes a playlist group type field storing a value identifying a data type for the group of media files. The data type includes, but is not limited to, one of the following: audio, video, timed image, and parallel image audio. The group data references a group of media files, and includes a starting point field and an ending point field. The starting point field stores a value representing a starting point of playback. The point field stores a value representing an ending point of playback. The playlist header includes a playlist summary type field storing a value identifying a type for the group of media files. The type comprises audio, video, or image.

Figure 8:
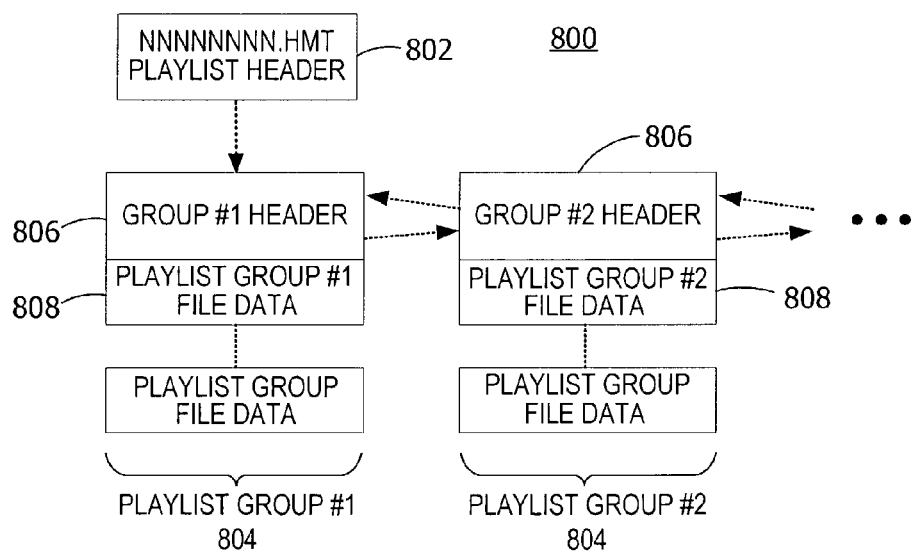
FIG. 8 is an exemplary block diagram illustrating the structure of a playlist having one or more groups.

In the embodiment of FIG. 8, each playlist is represented as a unique file having a name of the format "nnnnnnnn.HMT," where nnnnnnnn is a hexadecimal number that represents a Playlist File ID in CONTENTS.HMT (see Appendix A). For example, the Playlist File IDs may be a sequential list of hexadecimal numbers (i.e., 00000001, 00000002, etc.). The playlist files are created in a subdirectory of the root such as \HIGHMAT\PLAYLIST. There could be, for example, four different types of playlist groups: Audio (A), Video (V), Timed Image (TI), and Parallel Image Audio (PIA). The specific structure of each group in this embodiment is outlined below.

The playlist file includes a playlist header 802 (see Table 1) followed by one or more playlist groups 804 (see Table 2) such as Playlist Group #1 and Playlist Group #2. Each playlist group 804 includes, but is not limited to, a group header 806 and playlist group file data 808. The file is written such that there are no gaps between the data structures in the file.

TABLE 1

Playlist Header

| Offset | Length | Field Name |
| --- | --- | --- |
| 0 | 8 | Identifier |
| 8 | 2 | Version |
| 10 | 1 | Playlist Summary Type (Audio, Image, Video) |
| 11 | 1 | Repeat Count |
| 12 | 4 | Thumbnail ID |
| 16 | 4 | Number of Groups |
| 20 | 2 | Special Flags |

TABLE 2

| One or More Groups | |
| --- | --- |
| 4 | Offset of next Group (0 if last group) |
| 4 | Offset of previous Group (0 if first group) |
| 4 | Group Number |
| 1 | Type of Playlist Group (A, V, TI, PIA) |
| 1 | Reserved |
| Variable | Group data |

The Identifier field in the Playlist Header stores an eight byte entry containing "PLISTHMT" in ASCII. The Version field stores a two byte entry representing the version of the compressed media format specification used to author this file. For example version 1.20 would be stored as 0×78 (120 decimal). The Playlist Summary Type field is a one byte entry summarizing the types of all the individual playlists entries contained within it. The summary type is created by logically OR'ing the values in the following table together.

TABLE 3

Playlist Summary Type

| Playlist Type | Value |
|---|---|
| 00000000$_b$ | INVALID |
| 00000001$_b$ | AUDIO FILES ARE PRESENT |
| 00000010$_b$ | VIDEO FILES ARE PRESENT |
| 00000100$_b$ | IMAGE FILES ARE PRESENT |
| All other values | Reserved |

The Playlist Summary Type allows players to filter the list of playlists to show only the playlists that they can play, e.g. an audio-only player can exclude all playlists that contain images or video. The Repeat Count field is a one byte entry representing the number of times to repeat the playback of this playlist. If this playlist is invoked with a starting point, then each repetition finishes with the file immediately preceding the starting point. A value of zero indicates an infinite repeat count. For example, given three groups Group A, Group B and Group C and a Repeat Count of two, the playback order is A, B, C, A, B, and C. For the same three groups with a Starting Group Index of two, the playback order is B, C, A, B, C, and A.

The Thumbnail ID field is a four byte entry representing the index of the Thumbnail for this playlist in CONTENTS.HMT. If there is no thumbnail for this playlist, then the value is zero. The Number of Groups field is a four byte entry representing the count of Playlist Groups. The Special Flags field is a two byte entry reserved for future use. The Offset of Next Group is a four byte entry representing the offset from the beginning of nnnnnnnn.HMT to the next playlist group. This entry is zero if it is the last group. The Offset of Previous Group field is a four byte entry representing the offset from the beginning of nnnnnnnn.HMT to the previous playlist group. This entry is zero if it is the first playlist group. The Group Number field is a four byte entry representing the number of this group. The group number can be used to lookup the group name in TEXT.HMT. Group numbers are sequential starting at 1 and are unique for all groups in all playlists. The Type of Playlist Group field is a one byte entry representing the Playlist type defined in the following table.

TABLE 4

Playlist Group Type

| Playlist Type | Value |
|---|---|
| 0 | Audio (A) |
| 1 | Video (V) |
| 2 | Timed Image (TI) |
| 3 | Parallel Image Audio (PIA) |
| 4–255 | Reserved |

The format of the group data for each of these playlist group types is defined in the following sections. Media players not capable of playing types 3 and 4 nevertheless give a good experience when presented with such playlist entries. A PIA sequence is rendered as a Timed Image sequence (ignoring the audio). The Reserved field is a one byte entry reserved for future use. The Group data field represents the place in the format of the actual playlist group data. The format of each playlist group is defined below.

Audio Playlist Group

The following table lists the fields for the Audio Playlist Group.

TABLE 5

Audio Playlist Group (A)

| Offset | Length | Field Name |
|---|---|---|
| 0 | 4 | Number of Audio Files |
| 4 | 4 | Audio File ID 1 |
| 8 | 4 | Starting Point of Audio 1 |
| 12 | 4 | Ending Point of Audio 1 |
| 16 | 8 | Starting Offset Audio 1 |
| 24 | 8 | Ending Offset Audio 1 |
| ... | | ... |
| 4 + 28 * (n − 1) | 4 | Audio File ID n |
| 8 + 28 * (n − 1) | 4 | Starting Point of Audio n |
| 12 + 28 * (n − 1) | 4 | Ending Point of Audio n |
| 16 + 28 * (n − 1) | | Starting Offset Audio n |
| 24 + 28 * (n − 1) | | Ending Offset Audio n |

The Number of Audio Files field is a four byte entry representing the number of Audio file ID's that are listed in this group. There is an Audio File ID field (a four byte entry) for each Audio file in this group. The value is the index of the Audio file in CONTEST.HMT. There is a Starting point of Audio field (a four byte entry) for each Audio file in this group. The value is the offset in milliseconds to the starting point of playback. There is an Ending point of Audio field (a four byte entry) for each Audio file in this group. The value is the offset in milliseconds to the ending point of playback. A value of zero indicates play to the end of the file. The player recognizes the case where two sequential files have the same File ID and the Ending point of the first file and the starting point of the next file are equal. Playback should continue uninterrupted.

In another embodiment, the Audio Playlist Group in Table 5 includes only the following files: Number of Audio Files and Audio File ID 1 through Audio File ID n. The starting and ending points of audio and offsets for each audio file in the group are omitted.

Video Playlist Group

The following table lists the fields for the Video Playlist Group.

TABLE 6

Video Playlist Group (V)

| Offset | Length | Field Name |
|---|---|---|
| 0 | 4 | Number of Video Files |
| 4 | 4 | Video File ID 1 |
| 8 | 4 | Starting Point of Video 1 |
| 12 | 4 | Ending Point of Video 1 |
| ... | | ... |
| 4 + 12 * (n − 1) | 4 | Video File ID n |
| 8 + 12 * (n − 1) | 4 | Starting Point of Video n |
| 12 + 12 * (n − 1) | 4 | Ending Point of Video n |

Players may automatically resize the video to fill the display. The Number of Video Files field is a four byte entry representing the number of Video file ID's that are listed in this Video Playlist Group. There is a Video File ID field (a four byte entry) for each Video file in this group. The value is the index of the Video file in CONTENTS.HMT. There is a Starting point of Video field (a four byte entry) for each Video file in this group. The value is the offset in milliseconds to the starting point of playback. There is an Ending point of Video field (a four byte entry) for each Video file in this group. The value is the offset in milliseconds to the ending point of playback. A value of zero indicates play to the end of the file. The player recognizes the case where two sequential files have the same File ID and the Ending point of the first file and the starting point of the next file are equal, then playback should continue uninterrupted.

Timed Image Group

The following table lists the fields for the Timed Image Group.

TABLE 7

Timed Image Group (TI)

| Offset | Length | Field Name |
|---|---|---|
| 0 | 4 | Number of Image Files |
| 4 | 2 | Initial Transition |
| 6 | 2 | Final Transition |
| 8 | 4 | Image File ID 1 |
| 12 | 4 | Duration 1 |
| 16 | 2 | Transition 1 |
| ... | | |
| 8 + 10 * (n − 1) | 4 | Image File ID n |
| 12 + 10 * (n − 1) | 4 | Duration n |
| 16 + 10 * (n − 1) | 2 | Transition n |

The Number of Image Files field is a four byte entry representing the number of Image file ID's that are listed in this group. The Initial Transition field is a two byte entry defining the initial transition to be used to display the first image in the playlist. Exemplary allowed value include CUT and FADE IN. The Final Transition field is a two byte entry defining the final transition to be used to end the display the last image in the playlist. Exemplary allowed values include CUT and FADE OUT. There is an Image File field (a four byte entry) for each Image file in this group. The value is the index of the Image file in CONTENTS.HMT. The Duration field is a four byte entry representing the duration to display the image in milliseconds; a value of zero represents infinity. The minimum image duration in a Timed Image Playlist Group is five seconds. The Transition field is a two byte entry defining the type of transition to use when the player charges to the next image. A value of zero is defined as CUT, but other values are available in other embodiments. The list of transitions is defined in the following table.

TABLE 8

Transition Type

| Type of Entry | Value |
|---|---|
| 0 | CUT |
| 1 | FADE IN/FADE OUT |
| 2 | DISSOLVE |
| 3 | WIPE FROM TOP |
| 4 | WIPE FROM BOTTOM |
| 5 | WIPE FROM LEFT |
| 6 | WIPE FROM RIGHT |
| 7 | WIPE DIAGONAL LEFT |
| 8 | WIPE DIAGONAL RIGHT |
| 9–65,535 | RESERVED |

The duration of the transition is manufacturer defined. The transition duration does affect the image duration defined above. For example, a transition of two seconds duration between images of durations twenty and thirty seconds respectively would result in nineteen seconds of the first image followed by two seconds of transition between the images followed by twenty-nine seconds of the second image.

Parallel Image Audio Playlist Group

When implementing the next/previous playlist item function, players step through the Timed Image Playlist Group. The player synchronizes the audio to the next/previous image. The following table lists the fields in the parallel image audio playlist group.

TABLE 9

Parallel Image Audio Playlist Group (PIA)

| Length | Field Name |
|---|---|
| 4 | Offset of Audio Playlist Group |
| Variable | Timed Image Playlist Group (TI) |
| Variable | Audio Playlist Group (A) |

The Offset of Audio Playlist Group field is a four byte entry representing the offset from the beginning of nnnnnnnn.HMT to the Audio playlist group inside the PIA entry. The Timed Image Playlist Group field identifies the Timed Image group (see below). The Audio Playlist Entry field identifies the Audio Playlist group (see below).

Exemplary Operating Environment

Figure 9:
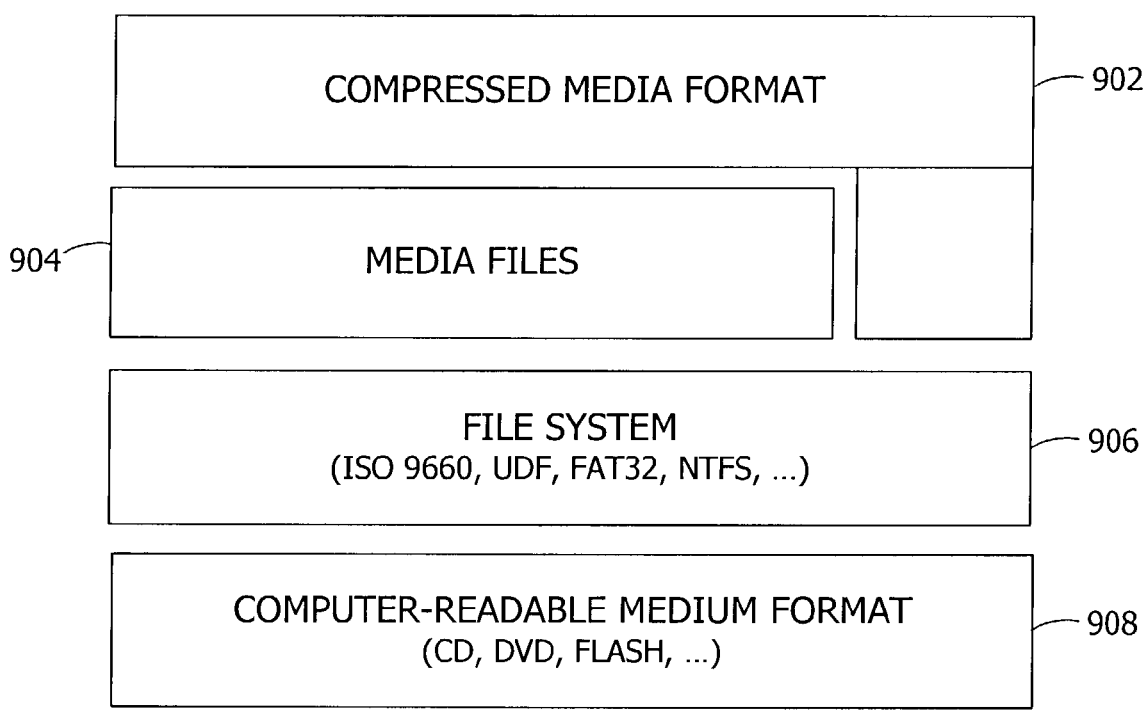
FIG. 9 is a block diagram illustrating an exemplary compressed media format for use with the invention software.

Referring now to FIG. 9, the invention is operable as part of an exemplary compressed media format 902 having a set of small files containing metadata, menus, and playlists in a compiled binary format designed for playback on feature-rich PC media players as well as low cost media players. See APPENDIX A for an example of accelerator files for use as part of a compressed media format. The exemplary compressed media format 902 of the invention encompasses audio, still images, and video media files in various formats. The compressed media format 902 defines a logical format for organizing compressed media files 904 in a file system 906 on computer-readable media 908 such as optical discs (e.g., CD-ROM, CD-R, CD-RW, DVD-RAM, DVD-R, DVD-RW, DVD+RW, DVD+R, DVD-ROM), flash memory (e.g., COMPACTFLASH brand, secure digital, MEMORY STICK brand), magnetic media (e.g., hard disks), and the like.

Figure 10:
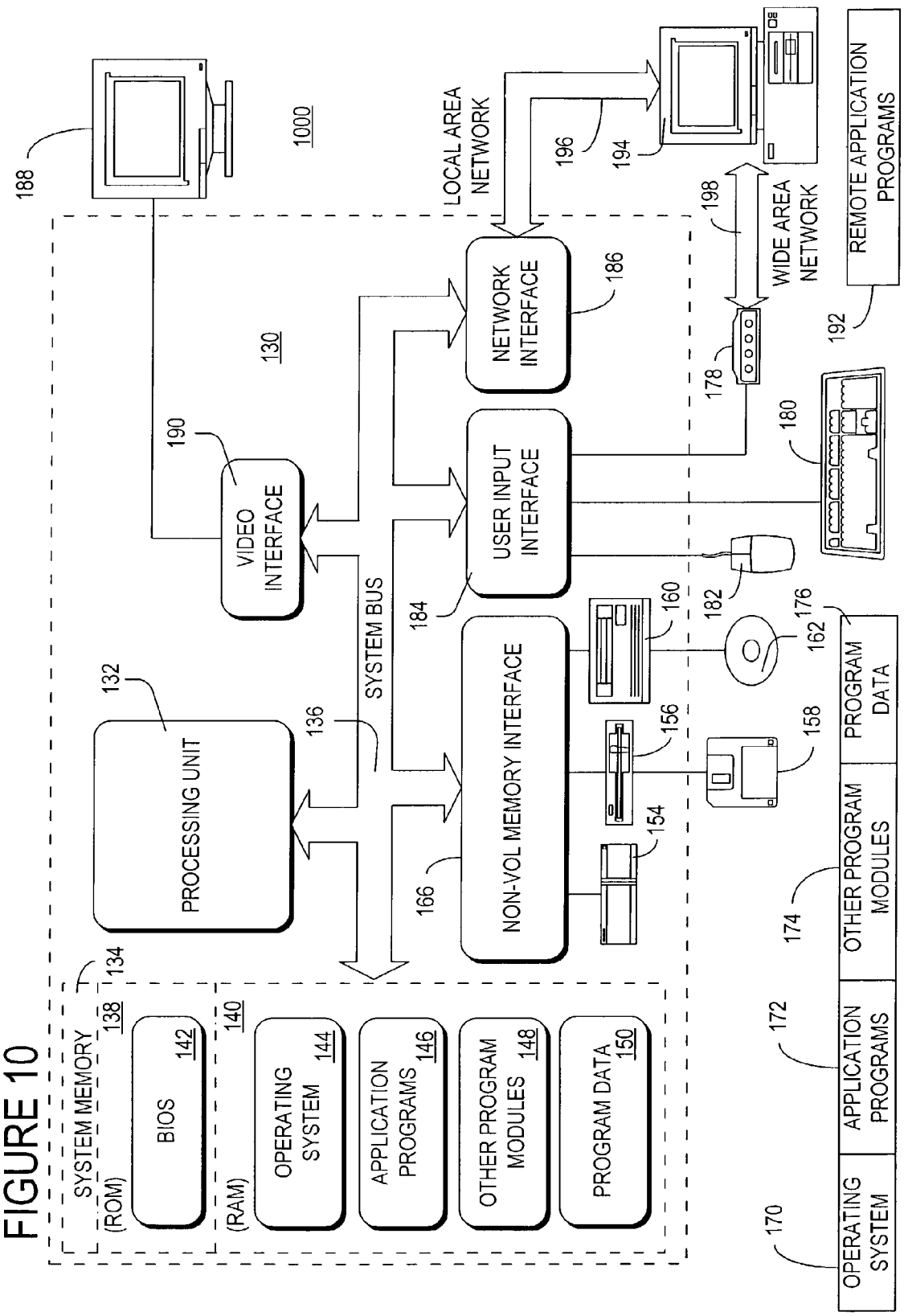
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile; removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (END) or other optical disk storage, magnetic cassettes, magnetic tape, magnetic disk storage or other magnetic storage devices, or any other medium tat can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RE, infrared, and other wireless media, are examples of communication media. Combinations of the arty of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stared in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a micro-processor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4 and FIG. 5 to group media files within a playlist to enable navigation among groups.

EXAMPLES

Figure 11:
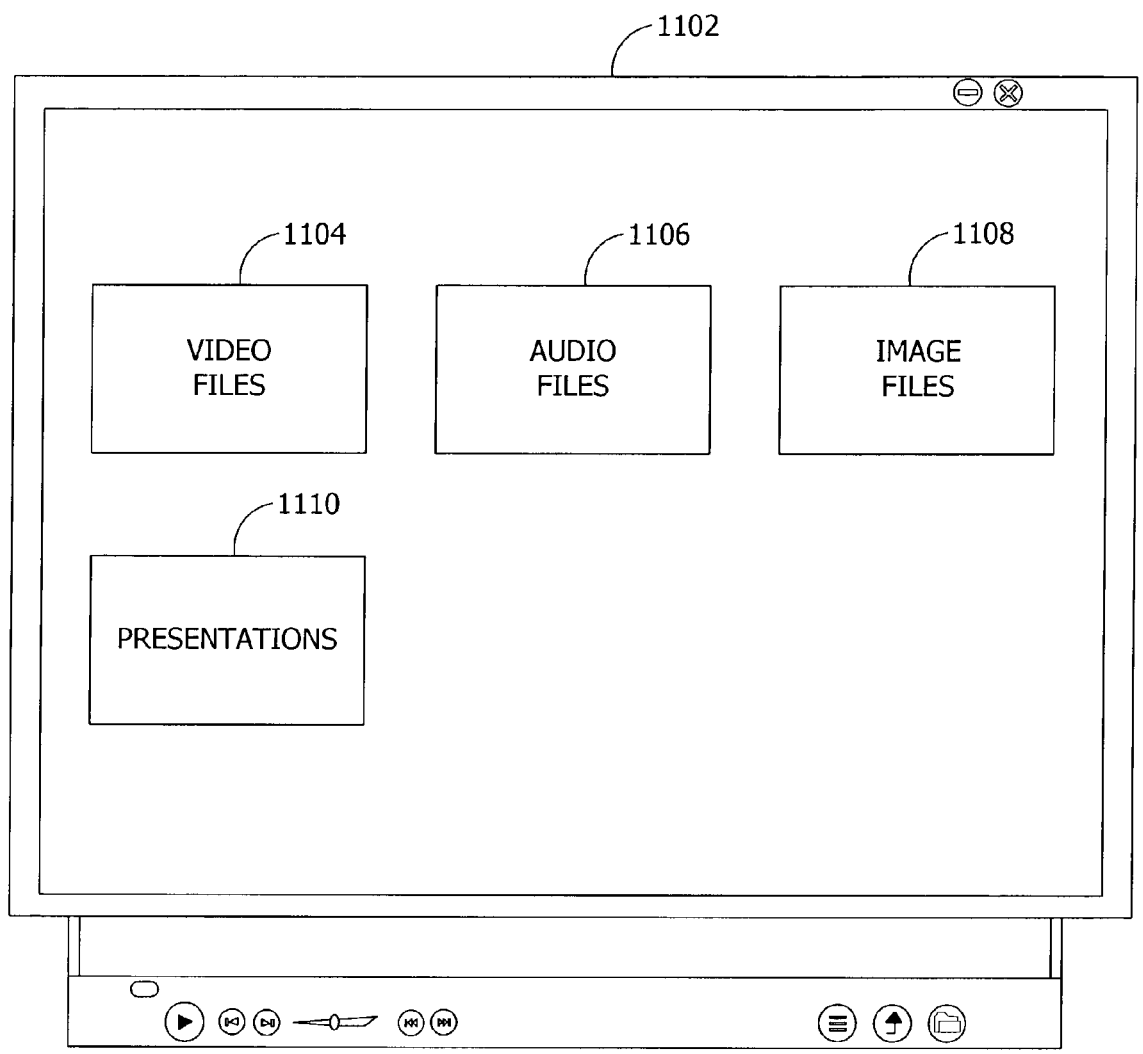
FIG. 11 is a screen shot of an exemplary user interface of playback software of the invention illustrating the media types available for rendering.
Figure 12:
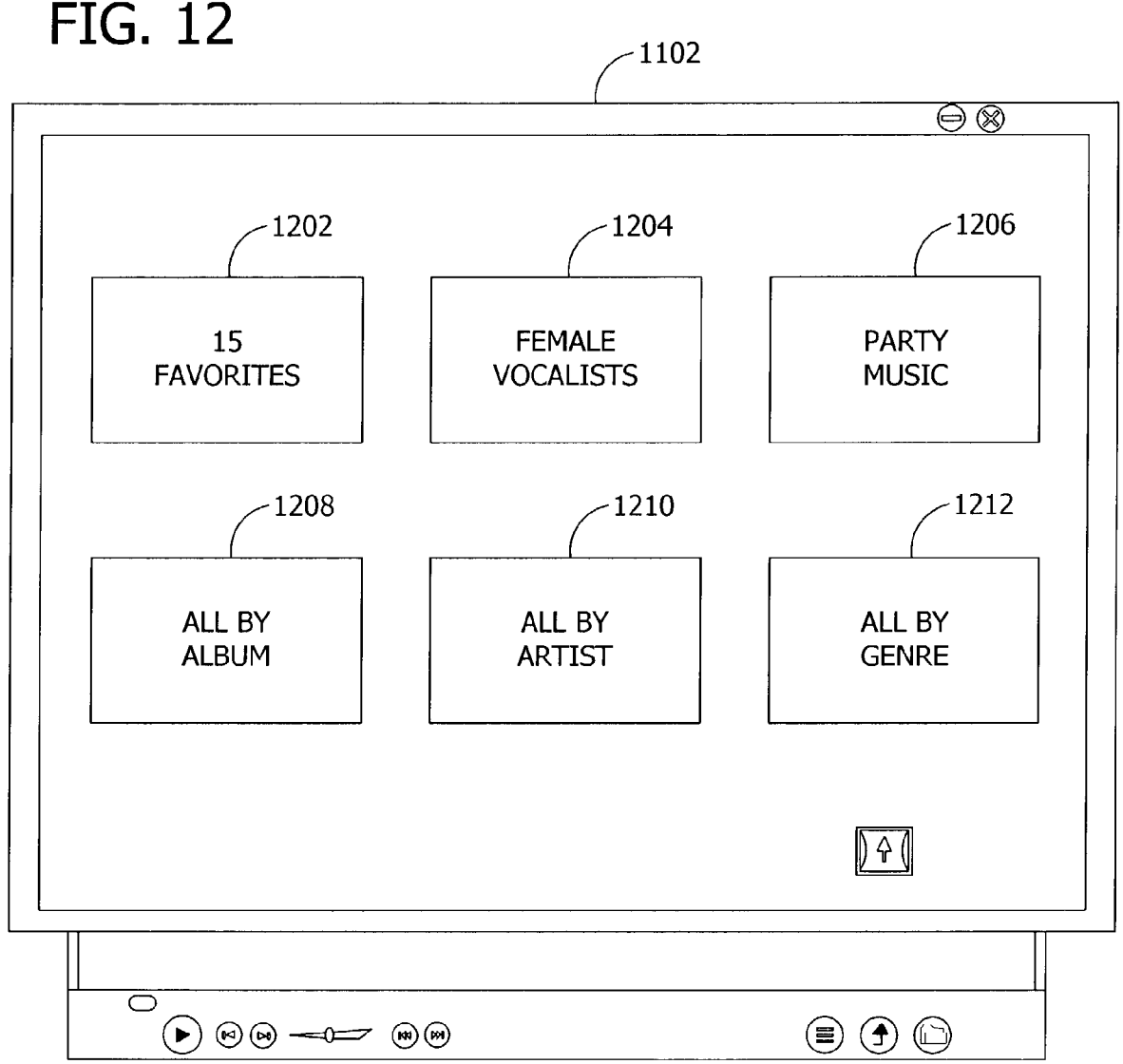
FIG. 12 is a screen shot of an exemplary user interface of playback software of the invention illustrating several audio playlists.
Figure 13:
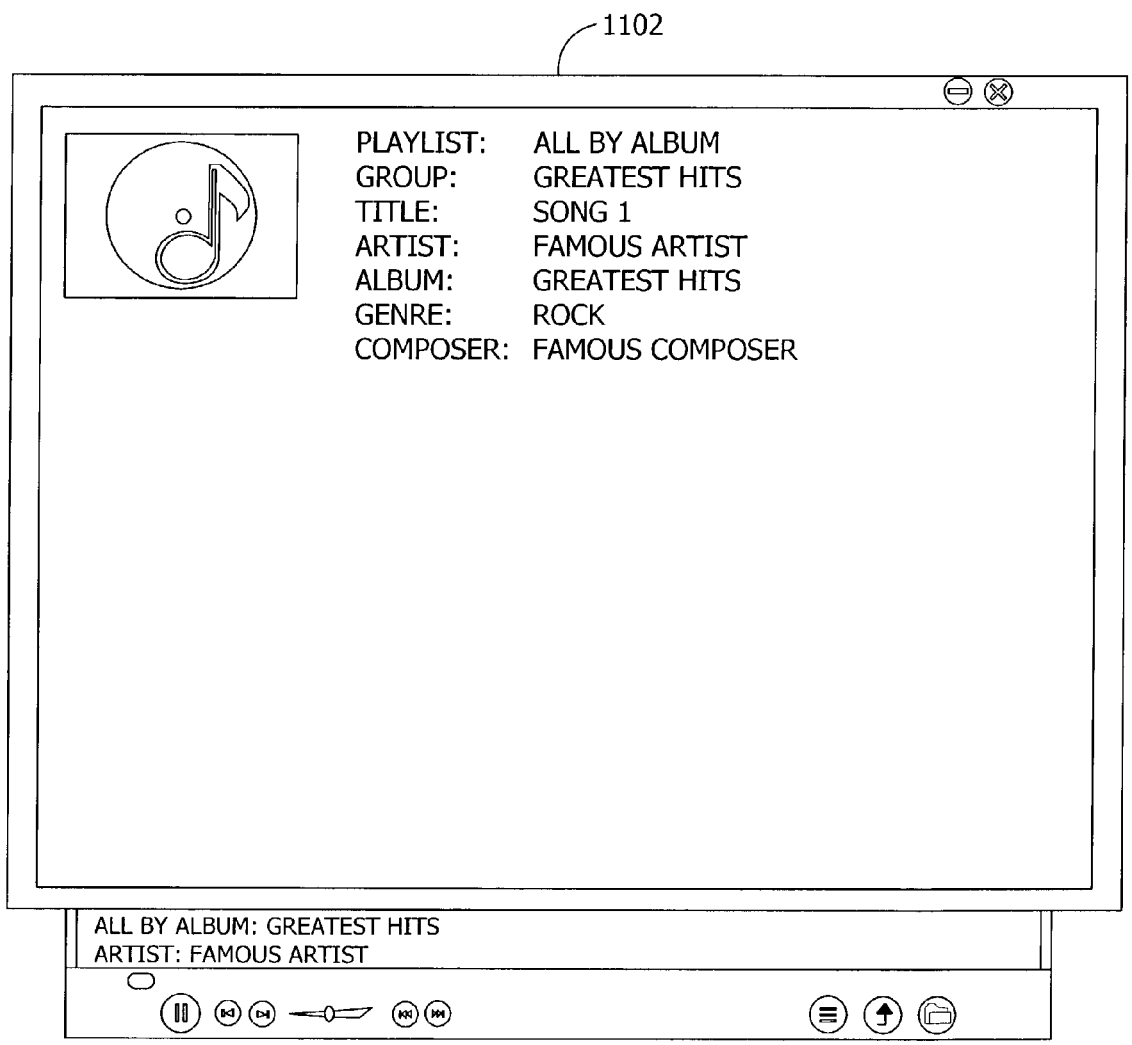
FIG. 13 is a screen shot of an exemplary user interface of playback software of the invention illustrating rendering of an audio playlist where the media content is grouped by album.
Figure 14:
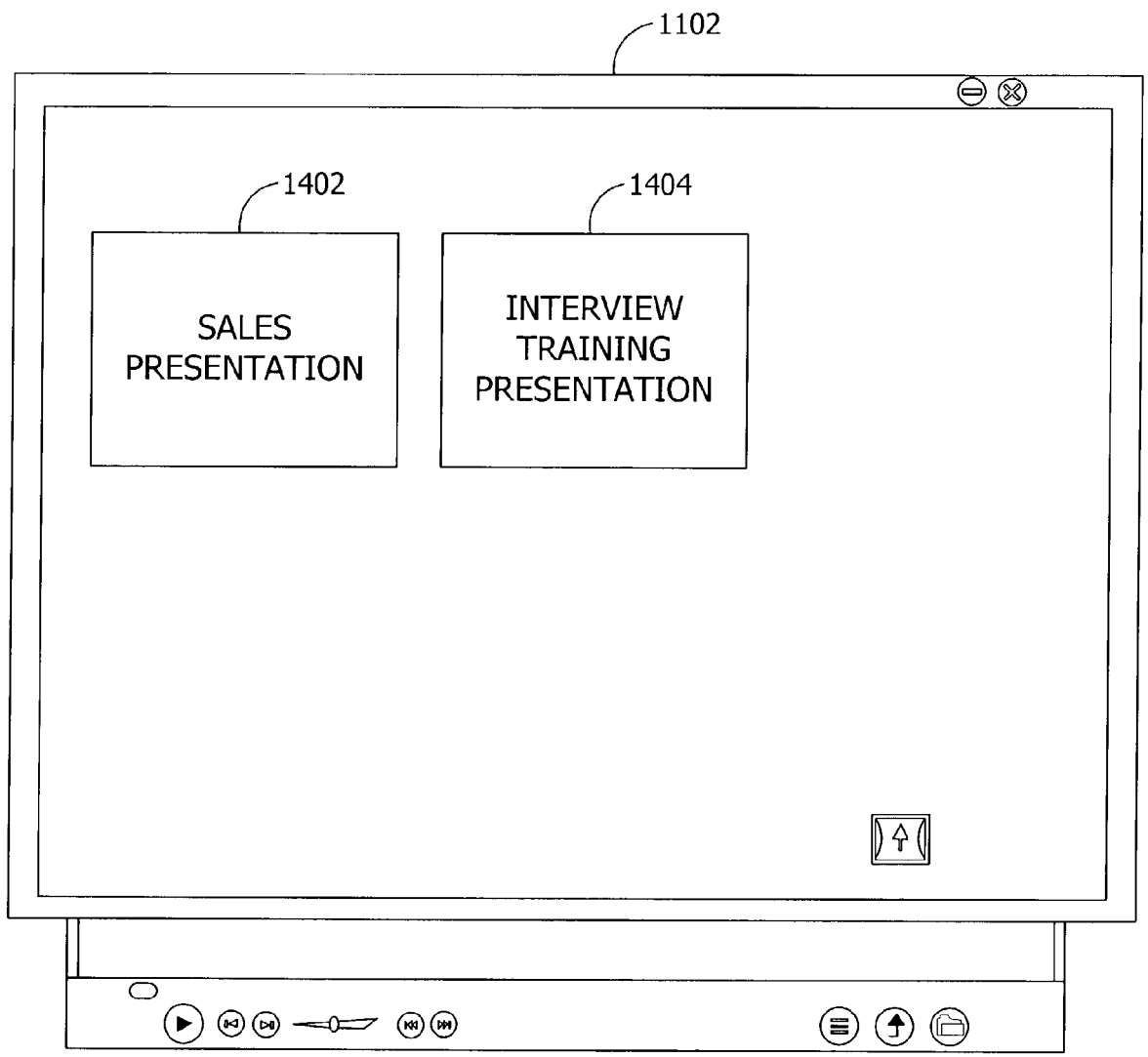
FIG. 14 is a screen shot of an exemplary user interface of playback software of the invention illustrating multimedia playlists.

The following examples illustrate the invention. The software and data structures of the invention are operable in systems including, but not limited to, media players and media authoring systems. For example, FIG. 11 is a screen shot of an exemplary user interface 1102 of playback software of the invention illustrating the media types available for rendering. In the example of FIG. 11, user interface 1102 displays icons indicating menu options 1104, 1106, 1108, and 1110 to select video files, audio files, image files, and presentations, respectively. FIG. 12 is a screen shot of user interface 1102 after the audio files menu option 1106 is selected by the user. Playlists i1202, 1204, 1206, 1208, 1210, and 1212 in FIG. 12 are entitled "15 Favorites," "Female Vocalists," "Party Music," "All by Album," "All by Artist," and "All by Genre"respectively. FIG. 13 is a screen shot of user interface 1102 after the user selects the "All by Album" playlist 1208. The exemplary user interface 1102 displays the name of the playlist and information about the media content currently being rendered. For example, the information may identify the playlist, the group within the playlist, title, artist, album, genre, or composer. FIG. 14 is a screen shot of user interface 1102 after the user selects the presentations menu option 1110. The exemplary presentations in FIG. 14 include a sales presentation 1402 and an interview training presentation 1404.

The invention supports various scenarios. For example, a user can select a large number of songs from a music library, arrange them in directories, and burn them to a CD-R using any CD burning software. The user can listen to the disc in a car, in a portable CD player, on a computer at work, or on any other capable CD playback device. The user uses album, artist, genre or directory-based playlists to select listening material. In another example, a user creates a slide show of digital still images from a vacation, adds some music, and saves the result to a CD-R that can be played in a DVD player. Similarly, after connecting a digital camcorder to a computer, the user selects an option on the computer to create a CD from the camcorder recording. Later, the user takes the disc containing a copy of the camcorder recording and inserts it in a DVD player or other video capable player. A menu appears from which the user navigates quickly to any event that was on the tape by skipping forward by shot, by day, or by event. In addition, the user can go back to the computer, delete a few shots or footage, add music, add titles and make copies of the improved version to send to relatives and friends. The relatives and friends can view the copies on either a new DVD player or other video capable player or on their existing PC. In yet another example, a digital camcorder records video onto an eight centimeter disc. The disc works directly in a computer or a DVD player, offering random access and editing capabilities in both environments. In another scenario, the user renders, on a consumer electronic device, content stored on a remote computer-readable medium. For example, the user, from the consumer electronic device, accesses a computer-readable medium on a remote computer via a network. The computer-readable medium stores media files and grouping information according to the invention. The user navigates the media files to select and render desired content on the consumer electronic device.

When implemented in the context of a compressed media format, the invention provides numerous advantages. The invention brings together the computer's greatest strengths in digitizing, organizing and editing media with the CD or DVD player's greatest strengths in convenient media playback. The invention and format could also serve as a medium for recording information in future consumer electronics devices (camcorders and DVD/CD-recorders). To consumers, the invention represents an easy way to navigate their photographs, home video, and music on their TV, on their portable CD player and in their car. It does this in an extremely affordable way using their existing CD-R drive, affordable CD-R media and a new DVD or car audio player that is comparably priced to similar devices lacking this capability. Using DVD recordable media, users can view and listen to vast collections of photographs, home video and music off a single disc. To consumer electronics manufacturers, the invention represents a way to offer a compelling new feature to consumers for little additional cost. It uses the same hardware (same drives, same memory buffers) together with decoding chips and logic to support the compressed media format.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings should be interpreted as illustrative and not in a limiting sense.

APPENDIX A

A. Accelerator Files

In an exemplary embodiment, accelerator files provide an improved startup experience by caching metadata information from media files and playlists in a compact binary representation that can be directly and easily manipulated by a low power CPU (as found in a typical portable CD player or DVD player). Accelerator files also provide a limited menu system that allows players to offer some PC-like functionality in terms of selecting what to show or play. For example, a menu might offer 'Album', 'Artist', 'Genre' selections leading to playlists grouped by the appropriate item. Or a menu might offer to show one of three sets of holiday photos stored on the disk.

All players should be capable of playing back compressed media disks regardless of whether the accelerator files are present or not on the disk. When the accelerator files are not present the player should offer at least sequential playback of the actual media files present on the disk. On a multi-session disk, the accelerator files are in the last session on the disk excluding files that do not contain references to other files (e.g., thumbnail files). If there are no accelerator files in the last session on the disk then accelerator files in all sessions are ignored. This ensures that the accelerator files and the media files are coherent.

Players should support the use of accelerator files unless they are capable of reading the M3U, ASX and WPL playlist files that may be present on a Compressed Media CD.

With the exception of the optional, CD only accelerator file LSN.HMT as defined herein, all other accelerator files defined herein do not include any references below the file system, i.e., there are no logical sector numbers (LSNs) in any of the required accelerator files. Players will typically resolve the file names in the accelerator files to LSNs during startup, reading the entire file system to create a table in memory mapping file numbers to values for start LSN and byte length of each file. Players with sufficiently fast drive mechanisms may avoid this startup procedure and simply resolve file names on a file-by-file basis during disk playback.

Disk creation software may store additional data on the disk in order that any previous user decisions about what to put in the menus can be preserved and re-presented when more data is added to the disk later. (e.g., If a user decides that there should be no menu option to display photos 'by month' then that choice could be persisted on the disk). The present specification does not address the layout for any such persistence files and they are application specific.

The accelerator files are split into two categories: ones that will probably be held in memory all the time, and ones that are only loaded when needed.

The layout of the binary data within the accelerator files is specified below.

Although the accelerator file includes menus and other data that is not present in the media files themselves and any playlists that may be present on the disk, it should always be possible to recreate the accelerator files for any disk simply by examining each media file and playlist to recreate the binary playlists, cached metadata and menus. This allows a user to add media files to a disk and have a new set of accelerator files created automatically without the software having to parse the accelerator files in the previous session. There is however nothing to stop a disk-creation application from being written that gives the user full control over menu creation, playlists etc.

B. Binary Representation of Accelerator Files

Figure 15:
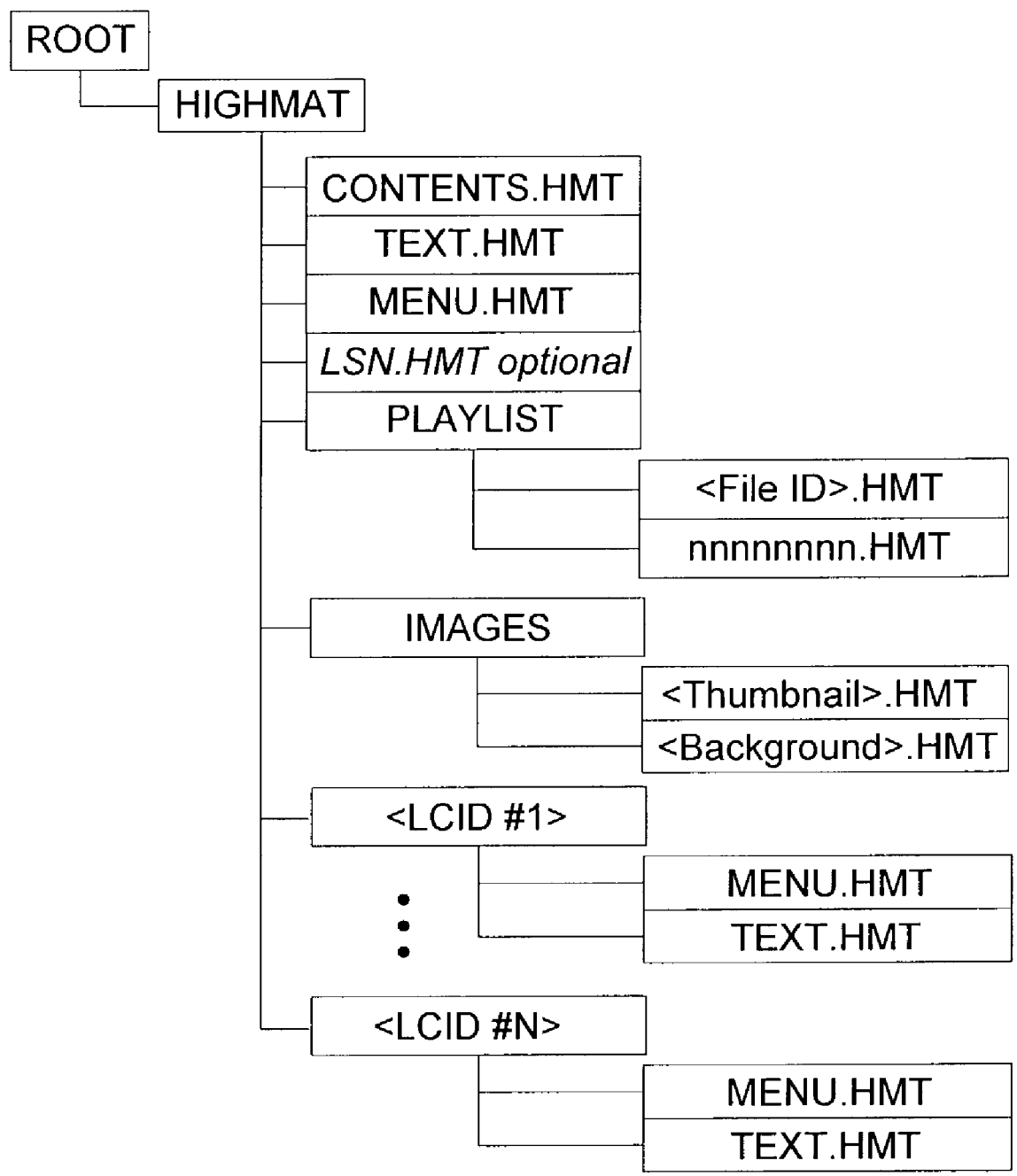
FIG. 15 is an exemplary block diagram illustrating a file system structure for the memory optimizing data.

FIG. 15 illustrates a file system in an exemplary compressed media format for use with the invention software. The accelerator files exist on a medium under a top-level directory called 'HIGHMAT' and include the following files: CONTENTS.HMT, nnnnnnnn.HMT, MENU.HMT, and TEXT.HMT. The CONTENTS.HMT file contains information about all the media files present on the medium. It contains a directory table, followed by the file entry tables for each of the supported file types (Audio, Video, Image and Playlist). There is one file for each playlist on the medium called 'nnnnnnnn.HMT' where nnnnnnnn is a hexadecimal playlist file identifier. These playlist files are created in a 'PLAYLIST' subdirectory. The MENU.HMT file contains the menu structure. The TEXT.HMT file contains all the textual information needed during playback.

In alternative embodiment, the following files are included: <Thumbnail>.HMT and <Background>.HMT. There is one file for each thumbnail on the medium (e.g., 160×120 JPG format with .HMT extension). The authoring software may name the files as appropriate. The Thumbnail files are created in an 'IMAGES' subdirectory. There is one file for each menu background on the medium. Backgrounds with a 4:3 aspect ratio are in 640×480 JPG format with .HMT extension. Backgrounds with a 16:9 aspect ratio are in 852×480 JPG format with .HMT extension. The authoring software may name the files as appropriate. The Background files are created in the 'IMAGES' subdirectory.

The HIGHMAT directory and all of the files within it may be marked as hidden by the software that creates the medium in order to lessen user confusion. Players should handle media whether these files and directories are hidden or not. All of the binary structures should be encoded using Little Endian byte ordering. File and Directory names should use Big Endian byte ordering. When the player encounters an unknown value the default behavior should be to ignore the offending file. For example, if Playlist Summary Type is equal to 255, then the entire playlist should be skipped.

C. CONTENTS.HMT

Figure 16:
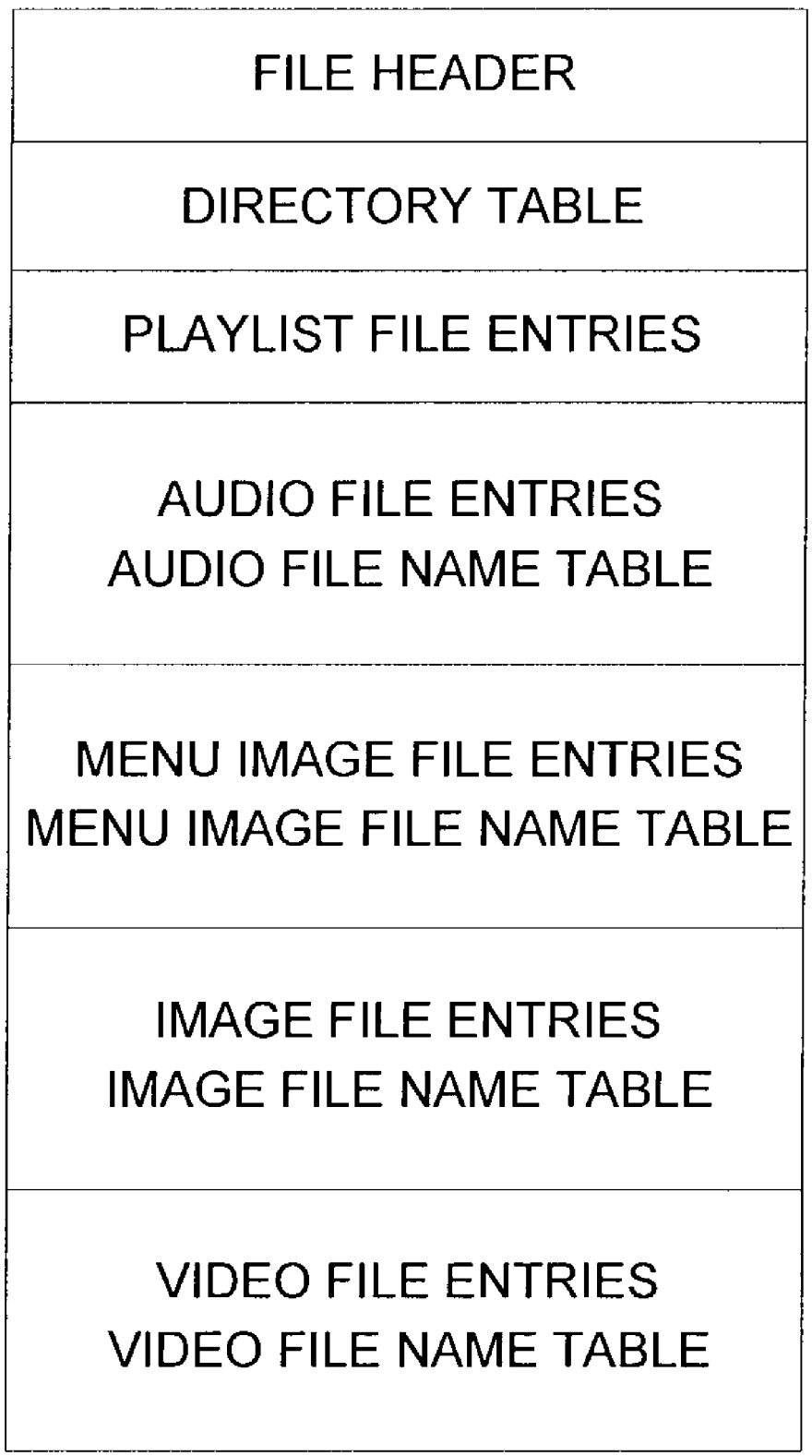
FIG. 16 is an exemplary block diagram illustrating a data structure representing information about all the media files on a computer-readable medium.

CONTENTS.HMT contains information about all the media files present on the disk. It contains a directory table, followed by the file entry tables for each of the supported file types (Audio, Video, Menu Image, Image and Playlist). This file is the main index that all of the other HIGHMAT files reference. FIG. 16 is an exemplary block diagram illustrating a data structure representing information about all the media files on a computer-readable medium. In one embodiment, the memory and disk-read optimization of the metadata cache is accomplished by separating the text and binary metadata into different cache files. This is important because the text metadata is large and not required until playback of a specific file begins. All of the binary metadata is contained in a single file (e.g., 'CONTENTS.HMT') while the text metadata is stored in a separate file (e.g., 'TEXT.HMT').

Another optimization is the actual layout of the binary metadata cache. The information in CONTENTS.HMT is organized into several sections (see FIG. 16). Generally, the text and binary metadata are referred to as accelerator data, memory optimizing data, or the like.

Uniquely Identifying Files

Each file can be uniquely identified by the order that it is listed in CONTENTS.HMT.

File numbers start at 1, and are sequential with no gaps.

The following terms are used in this document:

Contents ID: Each entry in CONTENTS.HMT has a unique ID that is derived from its relative position in the file. The term Contents ID can be used as a reference to any of the file types. The ID's start at 1 and are sequential throughout the file with no gaps. In this specification CID is used as an abbreviation for Contents ID.

Playlist File ID: Playlist files are the first files in CONTENTS.HMT and if present should start with file ID 1.

Audio File ID: Audio files follow the list of Playlist files in CONTENTS.HMT. The starting file ID should be the Number of Playlist files as defined herein plus 1.

Thumbnail ID: Menu Image files follow the list of Audio files in CONTENTS.HMT. The starting file ID should be the Number of Playlist files as defined herein plus the Number of Audio files as defined herein plus 1.

Image File ID: Image files follow the list of Menu Image files in CONTENTS.HMT. The starting file ID should be the Number of Playlist files as defined herein plus the Number of Audio files as defined herein plus the Number of Menu Image files as defined herein plus 1.

Video File ID: Video files follow the list of Image files in CONTENTS.HMT. The starting file ID should be the Number of Playlist files as defined herein plus the Number of Audio files as defined herein plus the Number of Menu Image files as defined herein plus the Number of Image files as defined herein plus 1.

The file numbers are not stored in this file as they are easily derived by the location of the file information in CONTENTS.HMT. The number of files in each file entry table is stored in the CONTENTS.HMT header. These numbers can be used to identify where in the file to start enumerating to find the specific file reference.

MENU.HMT, TEXT.HMT and nnnnnnn.HMT files reference files by this unique one to save space in these files and not store the same information in multiple places.

The grouping op like file types within CONTENTS.HMT allows players to ignore whole sections of the file if they do not handle that file type, e.g. an audio only player can discard everything after the audio section of CONTENTS.HMT. The directory table is designed to allow the compression of the path information contained in each of the many files.

Structure of CONTENTS.HMT File

The offsets in the accelerator files are byte offsets from the beginning of the file. The Audio, Menu Image, Image and Video file tables' should start on a 2K boundary.

The directory table should be written after the file header including the LCID table with no extra padding. See FIG. 16.

File Header

If there are no files available of a given type the corresponding table should be empty this should be authored as both the number of files and the offset to the table being zero.

TABLE A-1

File manifest header

| Offset | Length | Field Name |
|---|---|---|
| 0 | 8 | Identifier |
| 8 | 2 | Version |
| 10 | 8 | HMT Generation |
| 18 | 4 | Size of CONTENTS.HMT |
| 22 | 4 | Number of Directories |
| 26 | 4 | Offset to Directory table |
| 30 | 4 | Number of Playlist Files |
| 34 | 2 | Size of playlist Entry |
| 36 | 4 | Offset to Playlist file table |
| 40 | 4 | Number of Audio files |
| 44 | 2 | Size of Audio Entry |
| 46 | 4 | Offset to Audio file table |
| 50 | 4 | Number of Menu Image files |
| 54 | 2 | Size of Menu Image Entry |
| 56 | 4 | Offset to Menu Image file table |
| 60 | 4 | Number of Image files |
| 64 | 2 | Size of Image Entry |
| 66 | 4 | Offset to Image file table |
| 70 | 4 | Number of Video files |
| 74 | 2 | Size of Video Entry |
| 76 | 4 | Offset to Video file table |
| 80 | 2 | Number of LCID entries |
| 82 | 4 | Directory Number 1 |
| 86 | 4 | LCID 1 |
| ... | | |
| 82 + 8 * (n − 1) | 4 | Directory Number n |
| 86 + 8 * (n − 1) | 4 | LCID n |

Indentifier

This 8 byte entry contains "INFO_HMT" in ASCII.

Version

The 2 byte entry represents the version of the HMT specification used to author this file. For example version 1.20 would be stored as 0×78 (120 decimal)

HMT Generation

This 8 byte entry represents the generation of LSN.HMT that matches this CONTENTS.HMT. This CONTENTS.HMT should only be used with an LSN.HMT file that contains the same HMT Generation number. If the HMT Generation values do not match then the LSN.HMT file should be ignored by the player. A value of 0 means that there is no LSN.HMT file.

Size of CONTENTS.HMT

This 4 byte entry contains the size of CONTENTS.HMT in bytes.

Number of Directories

This 4 byte entry contains the number of directories in the directory table defined herein.

Offset to Directory Table

This 4 byte entry is the byte offset from the beginning of CONTENTS.HMT to the directory table.

Number of Playlist Files

This 4 byte entry contains the number of playlist files in the playlist file table defined herein. There should be at least one playlist file.

Size of Playlist Entry

This 2 byte entry is the size of a Playlist Entry in bytes.

Offset to Playlist File Table

This 4 byte entry is the byte offset from the beginning of CONTENTS.HMT to the playlist file table.

Number of Audio Files

This 4 byte entry contains the number of audio files in the audio file table defined herein.

Size of Audio Entry

This 2 byte entry is the size of an Audio File Entry in bytes as defined in Table A-4.

Offset to Audio File Table

This 4 byte entry is the byte offset from the beginning of CONTENTS.HMT to the audio file table. The offset should be a multiple of 2K, any gaps between the end of the Playlist File Table and the start of the Audio File Table should be ignored. A value of 0 indicates that there are no Audio Entries in CONTENTS.HMT—The number of Audio Files as defined herein should be 0 as well.

Number of Menu Image Files

This 4 byte entry contains the number of Menu Image files in the Menu Image file table defined herein.

Size of Menu Image Entry

This 2 byte entry is the size of an Menu Image File Entry in bytes as defined herein.

Offset to Menu Image File Table

This 4 byte entry is the byte offset from the beginning of CONTENTS.HMT to the Menu Image file table. The offset should be a multiple of 2K, any gaps between the end of the Audio File Table and the start of the Menu Image File Table should be ignored. A value of 0 indicates that there are no Menu Image Entries in CONTENTS.HMT—The number of Menu Image Files as defined herein should be 0 as well.

Number of Image Files

This 4 byte entry contains the number of Image files in the Image file table defined herein.

Size of Image Entry

This 2 byte entry is the size of an Image File Entry in bytes as defined herein.

Offset to Image File Table

This 4 byte entry is the byte offset from the beginning of CONTENTS.HMT to the Image file table. The offset should be a multiple of 2K, any gaps between the end of the Menu Image File Table and the start of the Image File Table should be ignored. A value of 0 indicates that there are no Image Entries in CONTENTS.HMT—The number of Image Files as defined herein should be 0 as well.

Number of Video Files

This 4 byte entry contains the number of video files in the video file table defined herein.

Size of Video Entry

This 2 byte entry is the size of a Video File Entry in bytes as defined in Table A-12.

Offset to Video File Table

This 4 byte entry is the byte offset from the beginning of CONTENTS.HMT to the video file table. The offset should be a multiple of 2K, any gaps between the end of the Image File Table and the start of the Video File Table should be ignored. A value of 0 indicates that there are no Video Entries in CONTENTS.HMT—The number of Video Files as defined herein should be 0 as well.

Number of LCID entries

This 2 byte entry represents the number of languages on this disk. This value must be at least 1.

Directory Number

This 4 byte entry is the index in the directory table as defined herein of the directory that contains the TEXT.HMT and MENU.HMT for this locale identifier. This should be either a subdirectory of \HIGHMAT with the LCID as the directory name; however a reference to \HIGHMAT itself is valid for the default language.

LCID n

This 4 byte entry represents the locale identifier.

Directory Table

The directory entries are numbered starting at 1, the offsets are at the beginning of the table to allow for easy direct indexing. The directory names should be terminated with a null UCS-2 character (two null bytes). The directory table should contain all of the directories on the disk that contain at least one file that is a valid JPG, HMT, MP3, ASF, WMA or WMV file.

The directory table should be formatted as follows:

TABLE A-2

Directory entry format

| Length | Field Name |
|---|---|
| 4 | Parent Directory Number #1 |
| 4 | Offset to directory name length #1 |
| ... | |
| 4 | Parent Directory Number #n |
| 4 | Offset to directory name length #n |
| 2 | Directory name Length #1 |
| Variable | Directory name #1 |
| ... | |
| 2 | Directory name Length #n |
| Variable | Directory name #n |

The rood directory should be stored in entry 1 with a parent entry of 0 (invalid entry number).

The directory entries should be listed in sorted order as defined herein.

Parent Directory Number

This 4 byte entry is the index in the Directory Table for the parent directory. This value should be 0 for the first Directory Entry.

Offset to Directory Name Length

This 4 byte entry is the byte offset from the beginning of CONTENTS.HMT to the directory name length for this entry.

Directory Name Length

This 2 byre entry contains the byte length of the directory name excluding the ending null UCS-2 character (two null bytes).

Directory Name this variable length is entry is the UCS-2 name of the directory. The name should be terminated with a null UCS-2 character (two null bytes). The maximum length for this entry is 111 UCS-2 characters including the null UCS-2 character. This entry should use Big-Endian word layout.

Playlist File Table

The Playlist File Table includes a list of Playlist File Entries. There should be one Playlist File Entry for each Playlist File.

No file name for the playlist file is stored because the file name for each playlist can be derived using the ID of the playlist file in CONTENTS.HMT as defined herein combined with a naming scheme.

Each Playlist file entry should be formatted as follows:

TABLE A-3

Playlist File Entry Format

| Offset | Length | Field Name |
|---|---|---|
| 0 | 4 | Directory Number |
| 4 | 1 | Playlist Summary Type (Audio, Image, Video) |
| 5 | 1 | reserved |

Directory Number

This 4 byte entry is the index in the directory table as defined herein of the directory that contains this file.

Playlist Summary Type

This value is exactly the same as that stored in the header of the Playlist file corresponding to the Playlist File Entry.

Reserved

This 1 byte entry is reserved for future use.

Audio File Table

The Audio File Table includes a list of Audio File Entries followed by the File name table (Table A-5). There should be one Audio File Entry for each Audio File. Windows Media Audio files should have a .WMA extension, and MP3 files should have an .MP3 extension. All other file extensions are invalid.

Putting the file name table after the Audio File Entries allows the player to discard the file name table from memory once the initial file name to LSN conversion has taken place, thereby keeping in memory only the actual data required for playback of each file.

The Audio File Entries should be listed in the sort order defined herein.

Each Audio file entry should be formatted as follows:

TABLE A-4

Audio File Entry Format

| Offset | Length | Field Name |
|---|---|---|
| 0 | 4 | Offset to Directory Number |
| 4 | 2 | File Type |
| 6 | 2 | Special Flags |
| 8 | 1 | Number of channels |
| 9 | 1 | Sample size (bit depth) |
| 10 | 4 | Average bit rate |
| 14 | 4 | File bit rate |
| 18 | 4 | Playing duration |
| 22 | 4 | Sampling freq. |
| 26 | 2 | Track Number |
| 28 | 4 | Thumbnail ID |

TABLE A-5

File name table

| Offset | Length | Field Name |
|---|---|---|
| | 4 | Directory Number CID#p+1 |
| | 2 | File Name Length CID #p+1 |
| | Variable | File Name CID#p+1 |
| | ... | |
| | 4 | Directory Number CID#n |
| | 2 | File Name Length CID #n |
| | Variable | File Name CID#n | p represents the number of playlist files
n-p represents the number of Audio Files Offset to Directory Number This 4 byte entry is byte offset from the beginning of CONTENTS.HMT to the directory numbers for this entry.

File Type

This 2 byte entry represent the File type, which means the data encoding format. Only the values defined for Audio Files are valid for this entry.

TABLE A-6

File Type

| File Type | Value |
|---|---|
| 0 | MP3 |
| 1 | WMA |
| 2–1023 | Reserved for Audio Files |
| 1024 | WMV |
| 1025 | MP4 optional |
| 1026–2047 | Reserved for Video Files |
| 2048 | JPG |
| 2049 | Thumbnail |
| 2050 | Menu Background 4 × 3 (640 × 480) |
| 2051 | Menu Background 16 × 9 (852 × 480) |
| 2052–3071 | Reserved for Image Files |
| 3072–65535 | Reserved for future use |

Special Flags

This 2 byte entry summarizes the special attributes of this file. The special flags entry is created by logically OR'ing the following values together:

TABLE A-7

Special Flags

| Special Flags | Value |
|---|---|
| 0000 0000 0000 0000$_b$ | NONE |
| xxxx xxxx xxxx xxx1$_b$ | DRM PROTECTED |
| xxxx xxxx xxxx x00x$_b$ | COPY FREE |
| xxxx xxxx xxxx x11x$_b$ | NO MORE COPIES |
| xxxx xxxx xxxx x10x$_b$ | COPY ONCE |
| All other values | RESERVED |

The Special flags entry allows players to filter files that they can play, e.g. a player that is not capable of playing protected content should exclude files marked as DRM protected.

Number of Channels

This 1 byte entry contains the number of channels of audio in this file.

Sample Size

This 1 byte entry contains the bit size per channel.

Average Bit Rate

This 4 byte entry contains the audio stream average bit rate in bits per second.

File Bit Rate

This 4 byte entry contains the total file bit rate in bits per second.

Playing Duration

This 4 byte entry contains the duration of this file in milliseconds.

Sampling Frequency

This 4 byte entry contains the sampling frequency in hertz.

Track Number

This 2 byte entry contains the track number of the audio file on the source media. A value of 0 indicates no track number.

Thumbnail ID

This 4 byte entry represents the Image File ID that is the thumbnail for this file in CONTENTS.HMT; if there is no thumbnail for this file then the value should be 0. This value can be used by authoring applications to prevent the regeneration of thumbnails.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Menu Image File Table

The Menu Image File Table is used to list all of the thumbnails and background images used in the MENU-.HMT file.

All menu image files should have an .HMT extension; all other file extensions are invalid.

The Menu Image File Table includes a list of Menu Image File Entries followed by the File name table (Table A-11). There should be one Menu Image File Entry for each Menu Image File.

The Menu Image File Entries should be listed in the sort order defined herein. Each Menu Image file entry should be formatted as follows:

TABLE A-8

Menu Image File Entry Format

| Offset | Length | Field Name |
| --- | --- | --- |
| 0 | 4 | Offset to Directory Number |
| 4 | 2 | File Type |
| 6 | 2 | Special Flags |

TABLE A-9

File name table

| Offset | Length | Field Name |
| --- | --- | --- |
|  | 4 | Directory Number CID#n+1 |
|  | 2 | File Name Length CID#n+1 |
|  | variable | File Name CID#n+1 |
|  | ... | ... |
|  | 4 | Directory Number CID#m |
|  | 2 | File Name Length CID#m |
|  | variable | File Name CID#m |

Offset to Directory Number

This 4 byte entry is the byte offset from the beginning of CONTENTS.HMT to the directory for this entry.

File Type

This 2 byre entry represents the File type, which means the data encoding format.

The only valid values are: thumbnail, menu background (4×3) and menu background (16×9).

Special Flags

This 2 byte entry is defined herein.

Directory Number

This 4 byte is the index in the directory table as defined herein of the directory that contains file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Image File Table

The Image File Table includes a list of Image File Entries followed by the File name table (Table A-11). There should be one Image File Entry for each Image File.

All image files should have either .JPG or .JPEG extension; all other file extensions are invalid.

The Image File Entries should be listed in the sort order defined herein.

Each Image file entry should be formatted as follows:

TABLE A-10

Image File Entry Format

| Offset | Length | Field Name |
| --- | --- | --- |
| 0 | 4 | Offset to Directory Number |
| 4 | 2 | File Type |
| 6 | 2 | Special Flags |
| 8 | 4 | Thumbnail ID |
| 12 | 2 | Vertical Size |
| 14 | 2 | Horizontal Size |

TABLE A-11

File name table

| Offset | Length | Field Name |
| --- | --- | --- |
|  | 4 | Directory Number CID#m+1 |
|  | 2 | File Name Length CID#m+1 |
|  | variable | File Name CID#m+1 |
|  | ... | ... |
|  | 4 | Directory Number CID#k |
|  | 2 | File Name Length CID#k |
|  | variable | File Name CID#k | m-k represents the number of Image files

Offset to Directory Number

This 4 byte entry is the byte offset from the beginning of CONTENTS.HMT to the directory number for this entry.

File Type

This 2 byte entry represents the File type, which means the data encoding format.

Only the values defined for Image Files excluding thumbnail, menu background (4×3) and menu background (16×9) are valid.

Special Flags

This 2 byte entry is defined herein of this specification.

Thumbnail ID

This 4 byte entry represents the Image File ID that is the thumbnail for this file in CONTENTS.HMT; if there is no thumbnail for this image then the value should be 0. This value can be used by authoring applications to prevent the regeneration of thumbnails.

Vertical Size

This 2 byte entry represents the vertical size of the image in pixels.

Horizontal Size

This 2 byte entry represents the horizontal size of the image in pixels.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Video File Table

The Video File Table includes a list of Video File Entries followed by the File name table (Table 3-13). There should be one Video File Entry for each Video File.

The valid file extensions for Windows Media Video files are .WMV and .ASF; .WMV is the preferred extension. The valid file extension for the optional MP4 files should be .ASF. All other file extensions are invalid.

Putting the file name table after the Video File Entries allows the player to discard the file name table from memory once the initial file name to LSN conversion has taken place, thereby keeping in memory only the actual data required for playback of each file.

The Video File Entries should be listed in the sort order defined herein.

Each Video file entry should be formatted as an Audio File Entry as defined herein followed by a Video Entry.

TABLE A-12

Video File Entry Format

| Offset | Length | Field Name |
|---|---|---|
| 0 | 4 | Offset to Directory Number |
| 4 | 2 | File Type |
| 6 | 2 | Special Flags |
| 8 | 1 | Audio number of channels |
| 9 | 1 | Audio sample size |
| 10 | 4 | Audio average bit rate |
| 14 | 4 | File bit rate |
| 18 | 4 | Playing duration |
| 22 | 4 | Audio sampling frequency |
| 26 | 2 | Track Number |
| 28 | 4 | Thumbnail ID |
| 32 | 4 | Video average bit rate |
| 36 | 2 | Video V-size |
| 38 | 2 | Video H-size |
| 40 | 4 | Frame rate |

TABLE A-13

File name table

| Offset | Length | Field Name |
|---|---|---|
| | 4 | Directory Number CID#k+1 |
| | 2 | File Name Length CID#k+1 |
| | Variable | File Name CID#k+1 |
| | ... | |
| | 4 | Directory Number CID#q |
| | 2 | File Name Length#q |
| | Variable | File Name CID#q | q-k represents the number of Video Files

File Type

This 2 byte entry represents the File type, which means the data encoding format.

Only the values defined for Video Files are valid for this entry.

Video Average Bit-Rate

This 4 byte entry contains the average bit rate in bits per second.

Video Vertical Size

This 2 byte entry contains the vertical size of the video file in pixels.

Video Horizontal Size

This 2 byte entry contains the horizontal size of the video file in pixels.

Frame Rate

This field should contain the frame rate, like 30/1.001 (NTSC), 25(PAL) etc. in 4 bytes. This field should be described as (first 2 bytes Integer)/(last 2 bytes Integer). The value should be 0 if the authoring application is unable to determine the frame rate. Authoring applications should use the Least Common Multiple form to represent the frame rate. For Example: 3000/1001 instead of 30000/10010 for NTSC.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

What is claimed is:

1. A computer-implemented method of grouping media files within a playlist, said method comprising selecting one or more media files according to a grouping criterion to define a first group from the media files, said first group referencing each of the selected media files;

generating a group header associated with the first group, said group header comprising a value identifying the first group and a reference to a second group to enable navigation between the first group and the second group during rendering of one of the selected media files; and storing the generated group header and references to each of the selected media files in a first data structure representing the first group on a computer-readable medium, said first data structure being independent of a second data structure representing the second group.

2. The computer-implemented method of claim 1, further comprising parsing the media flies to determine a playlist summary type associated with each of the media files.

3. The computer-implemented method of claim 2, wherein the playlist summary type identifies each of the parsed media files as comprising one or more of the following audio data, video data, and image data.

4. The computer-implemented method of claim 1, further comprising reading an input playlist comprising a list of media files to define a group from the input playlist.

5. The computer-implemented method of claim 1, wherein selecting occurs responsive to input from a user.

6. The computer-implemented method of claim 1, wherein a user specifies the grouping criterion.

7. The computer-implemented method of claim 1 wherein the reference to the second group comprises a reference to a next group within the playlist.

8. The computer-implemented method of claim 7, wherein the reference comprises a memory location offset to the next group.

9. The computer-implemented method of claim 1, wherein the reference to the second group comprises a reference to a previous group within the playlist.

10. The computer-implemented method of claim 9, wherein the reference comprises a memory location offset to the previous group.

11. The computer-implemented method of claim 1, wherein generating comprises generating a compressed group header comprising a pointer to a memory location associated with the second group.

12. The computer-implemented method of claim 1, wherein the grouping criterion comprises one or more of the following: artist, genre, album, date, number of files in the playlist, and directory name.

13. The computer-implemented method of claim 1, further comprising selecting one or more media files according to a plurality of grouping criteria to define one or more additional groups from the media files until all of the media files in the playlist have been included in at least one of the defined additional groups.

14. The computer-implemented method of claim 13, further comprising storing references to the selected one or more media flies, the defined additional groups, the generated group headers, and playlists referencing the defined additional groups on a computer-readable medium.

15. The computer-implemented method of claim 13, further comprising storing a name for each of the defined additional groups, in a separate table, to enable display of the name during playback or selection.

16. The computer-implemented method of claim 1, wherein the selected media files comprise one or more of the following: audio files, video files, and image files.

17. The computer-implemented method of claim 1, wherein one or more computer-readable media have computer-executable instructions for performing the computer-implemented method recited in claim 1.

18. In a media authoring tool, one or more computer-readable media having computer-executable components for grouping a plurality of media files within a playlist, said components comprising:

a playlist module for selecting one or more media files according to a grouping criterion to define a first group from the media files, said first group referencing each of said selected media files;

a population module for generating a group header associated with the first group, said group header comprising a value identifying the first group and a reference to a second group to enable navigation between the first group and the second group during rendering of one of the media files selected by the playlist module; and a writer module for storing the generated group header and references to the selected media files in a first data structure representing the first group on a computer-readable medium, said first data structure being independent of a second data structure representing the second group.

19. The computer-readable media of claim 18, further comprising an input module for parsing the media files to determine a playlist summary type associated with each of the media files.

20. The computer-readable media of claim 19, wherein the playlist summary type identifies each of the parsed media files as comprising one or more of the following: audio data, video data, and image data.

21. The computer-readable media of claim 18, wherein the population module generates a group header comprising a memory location offset to a next group.

22. The computer-readable media of claim 18, wherein the population module generates a group header comprising a memory location offset to a previous group.

23. The computer-readable media of claim 18, wherein the population module generates a group header comprising a pointer to a memory location associated with the second group.

24. The computer-readable media of claim 18, wherein the selected media files comprise one or more of the following: audio files, video files, and image files.

25. A computer-readable medium having stored thereon a data structure representing a group within a playlist, said data structure comprising:

a group header comprising a group number field storing a value identifying the playlist group, said group header further comprising offset fields storing references to other playlist groups to enable navigation between the playlist group and the other playlist groups;

group data referencing a group of media files; and a playlist header comprising a playlist summary type field storing a value identifying a type for the media files in the groups within the playlist, wherein the data structure is independent of other data structures representing the other playlist groups.

26. The computer-readable medium of claim 25, wherein the type comprises audio, video, or image.

27. The computer-readable medium of claim 25, wherein the group number field stores a value corresponding to a group description for the playlist group.

28. The computer-readable medium of claim 25, wherein the offset field stores a memory location offset to a next playlist group.

29. The computer-readable medium of claim 25, wherein the offset field stores a memory location offset to a previous playlist group.

30. The computer-readable medium of claim 25, wherein the offset field stores a pointer to a memory location associated with another group.

31. The computer-readable medium of claim 25, wherein the group data comprises:

a starting point field storing a value representing a starting point of playback; and an ending point field storing a value representing an ending point of playback.

32. The computer-readable medium of claim 25, wherein the group data comprises:
a starting offset field storing a value representing a physical byte starting offset; and
an ending offset field storing a value representing a physical byte ending offset.

33. The computer-readable medium of claim 25, wherein the group header comprises a playlist group type field storing a value identifying a data type for the group of media files.

34. The computer-readable medium of claim 33, wherein the data type comprises one or more of the following: audio, video, timed image, and parallel image audio.

35. A media player enabling navigation among groups of media flies within playlist groups, said media player comprising:
an input module for reading a playlist group referencing one or more media files, said playlist group comprising a group header and group data stored in a data structure on a computer-readable medium, said group header comprising a value identifying the playlist group and a reference to at least one other playlist group, said value corresponding to a group description associated with the playlist group, said group data identifying the one or more media files;
an interface module for displaying the group description to a user; and
a selection module for navigating, responsive to input from the user, to the other playlist group via the reference stored in the data structure, said data structure being independent of another data structure representing the other playlist group.

36. The media player of claim 35, wherein the media files comprise one or more of the following: audio files, video flies, and image files.

37. The media player of claim 35, wherein the input module reads a group header comprising a memory location offset to a next playlist group.

38. The media player of claim 35, wherein the input module reads a group header comprising a memory location offset to a previous playlist group.

39. The media player of claim 35, wherein the input module reads a group header comprising a pointer to a memory location associated with another playlist group.

40. The media player of claim 35 wherein a random play option allows random play by group within a playlist.

41. The media player of claim 35 wherein a shuffle play option allows shuffle play by group within a playlist.

* * * * *

UNITED STATES PATENT AND TRADEMARK OFFICE
CERTIFICATE OF CORRECTION

| | | |
|---|---|---|
| PATENT NO. | : 7,043,477 B2 | |
| APPLICATION NO. | : 10/273415 | |
| DATED | : May 9, 2006 | |
| INVENTOR(S) | : Ian Cameron Mercer et al. | |

It is certified that error appears in the above-identified patent and that said Letters Patent is hereby corrected as shown below:

On the title page, item (56), under "Other Publications", in column 2, line 3, delete "Proceedigns" and insert -- Proceedings --, therefor.

On the title page, item (57), in "Abstract", in column 2, line 15, delete "formal" and insert -- format --, therefor.

In column 9, line 7, after "'Other'" insert -- . --.

In column 9, line 55, delete "'Directories'has" and insert -- 'Directories' has --, therefor.

In column 12, line 26, delete "The" and insert -- These --, therefor.

In column 13, line 41, after "last" insert -- playlist --.

In column 14, line 30, delete "CONTEST" and insert -- CONTENTS --, therefor.

In column 14, line 42, delete "files" and insert -- fields --, therefor.

In column 15, line 37, delete "value" and insert -- values --, therefor.

In column 15, line 49, delete "charges" and insert -- changes --, therefor.

In column 17, line 11, after "nonvolatile" delete ";" and insert -- , --, therefor.

In column 17, line 17, delete "(END)" and insert -- (DVD) --, therefor.

In column 17, line 20, delete "tat" and insert -- that --, therefor.

In column 17, line 30, delete "RE" and insert -- RF --, therefor.

In column 17, line 32, delete "arty" and insert -- any --, therefor.

In column 18, line 50, delete "stared" and insert -- stored --, therefor.

In column 19, line 60, delete "i1202" and insert -- 1202 --, therefor.

In column 19, line 63, delete "Genre"respectively" and insert -- Genre" respectively --, therefor.

In column 23, line 45, delete "nnnnnnn" and insert -- nnnnnnn --, therefor.

In column 23, line 46, delete "one" and insert -- number. This was done --, therefor.

CERTIFICATE OF CORRECTION (continued)
U.S. Pat. No. 7,043,477 B2

In column 23, line 48, delete "op" and insert -- of --, therefor.

In column 24, line 30, delete "Indentifier" and insert -- Identifier --, therefor.

In column 24, line 34, delete "The" and insert -- This --, therefor.

In column 24, line 36, after "(120 decimal)" insert -- . --.

In column 26, line 35, delete "rood" and insert -- root --, therefor.

In column 26, line 50, delete "byre" and insert -- byte --, therefor.

In column 26, line 54, delete "this" and insert -- This --, therefor.

In column 26, line 54, after "length" delete "is".

In column 28, line 2, after "entry is" insert -- the --.

In column 28, line 3, delete "numbers" and insert -- number --, therefor.

In column 28, line 6, delete "represent" and insert -- represents --, therefor.

In column 29, line 64, above "Offset to Directory Number"
insert -- m-n represents the number of Menu Image files --.

In column 29, line 67, after "directory" insert -- number --.

In column 30, line 2, delete "byre" and insert -- byte --, therefor.

In column 30, line 10, after "4 byte" insert -- entry --.

In column 30, line 11, after "contains" insert -- this --.

In column 33, line 7, in Claim 2, delete "flies" and insert -- files --, therefor.

In column 33, line 12, in Claim 3, after "following" insert -- : --.

In column 33, line 20, in Claim 7, after "claim 1" insert -- , --.

In column 33, line 48, in Claim 14, delete "flies" and insert -- files --, therefor.

In column 35, line 17, in Claim 35, delete "flies" and insert -- files --, therefor.

In column 36, line 11, in Claim 36, delete "flies" and insert -- files --, therefor.

Signed and Sealed this

Thirtieth Day of March, 2010

David J. Kappos
*Director of the United States Patent and Trademark Office*